United States Patent
Hwang

(10) Patent No.: US 9,078,141 B2
(45) Date of Patent: Jul. 7, 2015

(54) METHOD AND APPARATUS FOR FORMING VIRTUAL CELL IN WIRELESS COMMUNICATION SYSTEM

(75) Inventor: Pil-Young Hwang, Gimpo-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 320 days.

(21) Appl. No.: 13/618,971

(22) Filed: Sep. 14, 2012

(65) Prior Publication Data

US 2013/0065622 A1   Mar. 14, 2013

(30) Foreign Application Priority Data

Sep. 14, 2011   (KR) .......................... 10-2011-0092455

(51) Int. Cl.
H04W 16/28   (2009.01)
(52) U.S. Cl.
CPC ..................... *H04W 16/28* (2013.01)
(58) Field of Classification Search
CPC ............................... H04W 88/00; H04W 16/28
USPC ........... 455/509, 452.1, 446, 422.1, 449, 524, 455/69, 500, 67.11, 67.14, 62
See application file for complete search history.

(56) References Cited

U.S. PATENT DOCUMENTS

| | | | |
|---|---|---|---|
| 2004/0127223 A1* | 7/2004 | Li et al. | 455/446 |
| 2012/0157140 A1* | 6/2012 | Kim et al. | 455/501 |
| 2013/0053079 A1* | 2/2013 | Kwun et al. | 455/509 |

FOREIGN PATENT DOCUMENTS

| | | |
|---|---|---|
| KR | 10-2011-0008704 | 1/2011 |
| KR | 10-2011-0013230 | 2/2011 |
| WO | WO 2010/025148 A1 | 3/2010 |

OTHER PUBLICATIONS

International Search Report dated Mar. 27, 2013 in connection with International Patent Application No. PCT/KR2012/007338, 3 pages.
Written Opinion of the International Searching Authority dated Mar. 27, 2013 in connection with International Patent Application No. PCT/KR2012/007338, 5 pages.

* cited by examiner

*Primary Examiner* — John J Lee

(57)   ABSTRACT

An apparatus is configured to perform a method for forming a virtual cell in a wireless communication system. A method of a Base Station (BS) for forming a virtual cell in a wireless communication system includes determining at least one beam among a plurality of beams through beam training with a terminal. The method also includes confirming a collaborative beam of a neighboring BS for the determined beam, and sending a request for virtual cell formation for the terminal, to the terminal and the neighboring BS corresponding to the collaborative beam.

20 Claims, 21 Drawing Sheets

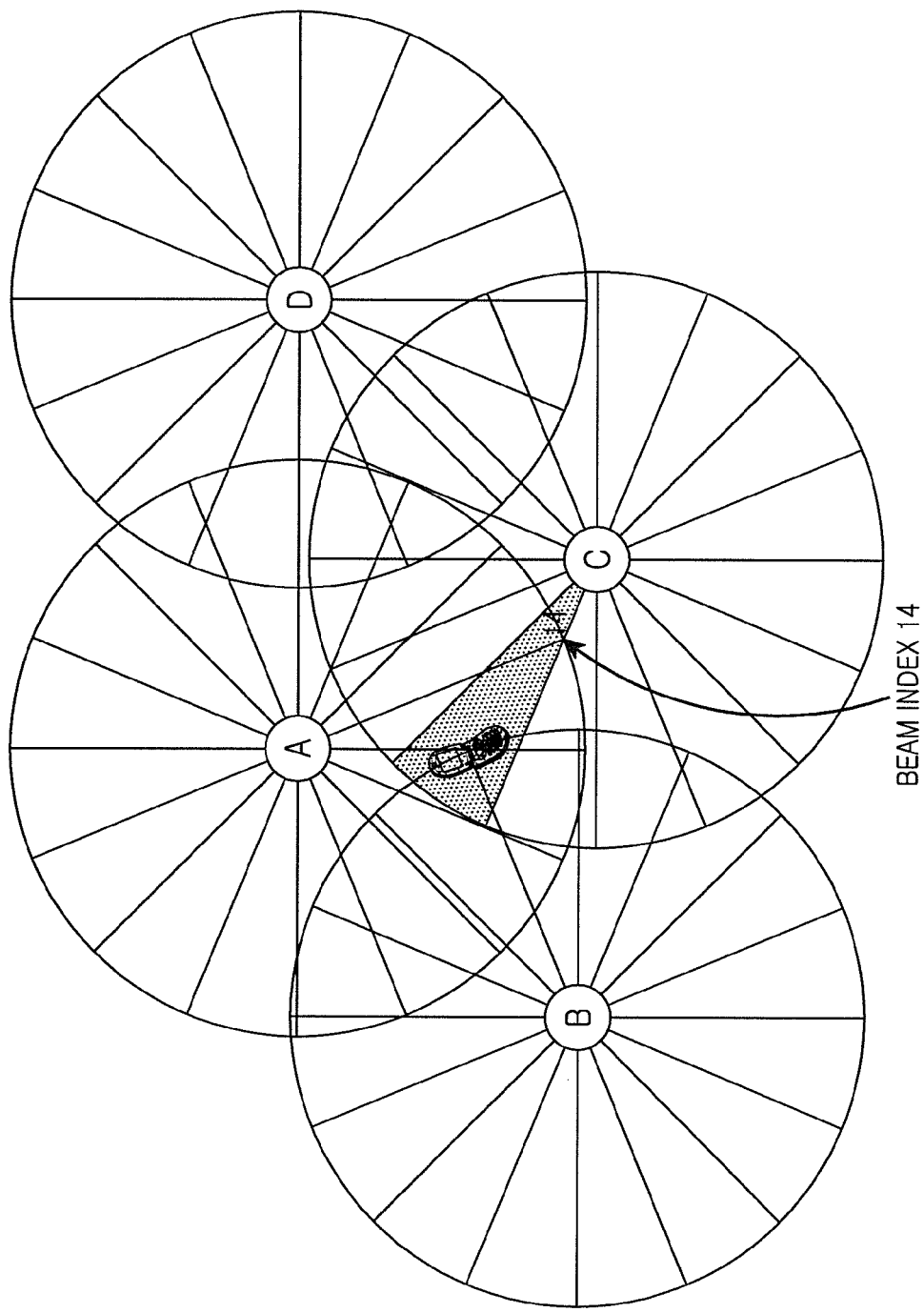

METHOD AND APPARATUS FOR FORMING VIRTUAL CELL IN WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Sep. 14, 2011 and assigned Serial No. 10-2011-0092455, the contents of which are herein incorporated by reference.

TECHNICAL FIELD OF THE INVENTION

The present disclosure relates to a method and apparatus for forming a virtual cell in a wireless communication system. More particularly, the present disclosure relates to a method and apparatus for forming a virtual cell in a wireless communication system in the wireless communication system.

BACKGROUND OF THE INVENTION

In a cellular communication environment, serious interference can occur in a cell boundary area when neighboring cells use the same frequency. Accordingly, the cellular communication system may provide various methods for decreasing inter-cell interference while improving a capacity of a cell boundary. In one method, in a cellular communication system, a central controller constructs a virtual cell with a plurality of neighboring cells considering an instantaneous channel value of a terminal located at a cell boundary and a traffic situation, and allows the plurality of cells constituting the virtual cell to collaborate and communicate. As illustrated in FIG. 1 for example, a scheme is provided in which, in a cellular environment in which one macro cell 100 and a plurality of pico cells 110-1 to 110-4 coexist, a central controller 120 selects the one macro cell 100 and the two pico cells 110-1 and 110-2 located adjacent to a terminal 102 for the terminal 102 located at a boundary of the pico cells 110-1 and 110-2, and forms a virtual cell with the selected one macro cell 100 and two pico cells 110-1 and 110-2, whereby the one macro cell 100 and the two pico cells 110-1 and 110-2 collaborate and communicate.

The introduction of a microwave (i.e., millimeter (mm) wave) system to secure a wide frequency band is expected. The millimeter wave system takes beamforming technology into consideration to overcome a propagation path loss caused by a high frequency band. The beamforming technology means a technology of communicating by reconciling beam directions between a Base Station (BS) and a terminal through beam training between the BS and the terminal.

The millimeter wave system may form a virtual cell with a plurality of cells and communicate in collaboration so as to reduce inter-cell interference while improving a capacity of a cell boundary. However, a method of forming a virtual cell according to the conventional art has been proposed based on a BS having an omni-directional antenna, so it may be unsuitable in forming a virtual cell with cells to which beamforming technology is applied. For instance, when forming a virtual cell with cells to which beamforming technology is applied according to the conventional scheme, the conventional method has to perform a procedure of performing beam training about all beam indexes by the BS and selecting a specific beam index that will communicate with a terminal. Thus, there is a disadvantage of being inefficient because energy waste and delay caused by beam training increase.

Accordingly, there is a need to provide a way of efficiently forming a virtual cell between cells to which a beamforming technology is applied.

SUMMARY OF THE INVENTION

To address the above-discussed deficiencies of the prior art, it is a primary object to provide a method and apparatus for forming a virtual cell in a wireless communication system.

Another aspect of the present disclosure is to provide a method and apparatus for forming a virtual cell on the basis of collaborative beam index information between Base Stations (BSs) in a wireless communication system.

A further aspect of the present disclosure is to provide a method and apparatus for sensing a change of a beam index dependent on a movement of a terminal and re-forming a virtual cell in a wireless communication system.

Yet another aspect of the present disclosure is to provide a method and apparatus in which a BS selects a beam index that will form a virtual cell, and communicates in collaboration with a neighboring BS forming the virtual cell using the selected beam index in a wireless communication system.

The above aspects are achieved by providing a method and apparatus for forming a virtual cell in a wireless communication system.

According to one aspect of the present disclosure, a method of a BS for forming a virtual cell in a wireless communication system is provided. The method includes determining at least one beam among a plurality of beams through beam training with a terminal, and confirming a collaborative beam of a neighboring BS for the determined beam. The method also includes sending a request for virtual cell formation for the terminal, to the terminal and the neighboring BS corresponding to the collaborative beam.

According to another aspect of the present disclosure, a method of a neighboring BS for forming a virtual cell in a wireless communication system is provided. The method includes receiving a request for virtual cell formation of a terminal, from a first BS, and confirming at least one collaborative beam for a beam determined in the first BS. The method also includes performing beam training with the terminal on the basis of the confirmed at least one collaborative beam, and selecting a collaborative beam for virtual cell formation.

According to a further aspect of the present disclosure, a method of a terminal for forming a virtual cell in a wireless communication system is provided. The method includes determining at least one beam among a plurality of beams through beam training with a first BS, receiving information about a neighboring BS that will form a virtual cell, from the first BS, and determining a beam for the neighboring BS through beam training with the neighboring BS.

According to yet another aspect of the present disclosure, a BS apparatus for forming a virtual cell in a wireless communication system is provided. The apparatus includes a beamforming unit configured to form a plurality of beams each having different directivity. The apparatus also includes a controller configured to control a function for controlling the beamforming unit, perform beam training with a terminal, determine at least one beam among the plurality of beams, confirm a collaborative beam of a neighboring BS for the determined beam, and send a request for virtual cell formation for the terminal, to the terminal and the neighboring BS corresponding to the collaborative beam.

According to still another aspect of the present disclosure, a neighboring BS apparatus for forming a virtual cell in a wireless communication system is provided. The apparatus includes a beamforming unit configured to form a plurality of beams each having different directivity. The apparatus also includes a controller configured to receive a request for virtual cell formation of a terminal, from a first BS, confirm at least one collaborative beam for a beam determined in the first BS, control the beamforming unit on the basis of the confirmed collaborative beam, perform beam training with the terminal, and select a collaborative beam for virtual cell formation.

According to still another aspect of the present disclosure, an apparatus of a terminal for forming a virtual cell in a wireless communication system is provided. The apparatus includes a beamforming unit configured to form a plurality of beams each having different directivity. The apparatus also includes a controller configured to control a function for controlling the beamforming unit, performing beam training with a first BS, determining at least one beam among the plurality of beams, receiving information about a neighboring BS that will form a virtual cell, from the first BS, and determining a beam for the neighboring BS through beam training with the neighboring BS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A to 4F illustrate an example of forming a virtual cell through beam training in a wireless communication system according to the present disclosure;

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Preferred embodiments of the present disclosure will be described herein below with reference to the accompanying drawings. In the following description, well-known functions or constructions are not described in detail since they would obscure the disclosure in unnecessary detail. Terms described below, which are defined considering functions in the present disclosure, can be different depending on user and operator's intention or practice. Therefore, the terms should be defined on the basis of the disclosure throughout this specification.

Below, the present disclosure describes a method and apparatus for forming a virtual cell in a wireless communication system supporting a beamforming technology.

In the present disclosure, a Base Station (BS) forms a plurality of beams each having directivity. Here, each of the plurality of beams can be a beam formed by one antenna or can be a beam formed by adjusting the directivity of an array antenna. For example, the BS has sixteen antennas, and the BS can form a total of sixteen beams by forming one beam per one antenna. For another example, the BS has an array antenna composed of sixteen antennas, and the BS may form a total of sixteen beams by adjusting the directivity of a plurality of antennas included in the array antenna. Accordingly, the coverage area of a specific beam of each BS can be overlapped with the coverage area of a specific beam of a neighboring BS. Accordingly, in the present disclosure, beams whose coverage areas are overlapped are defined as collaborative beams, and a virtual cell is formed using the collaborative beams. Particularly, in the present disclosure, each BS minimizes beam training for forming a virtual cell, by previously storing information about a collaborative beam, i.e., information about a collaborative beam index.

Figure 1:
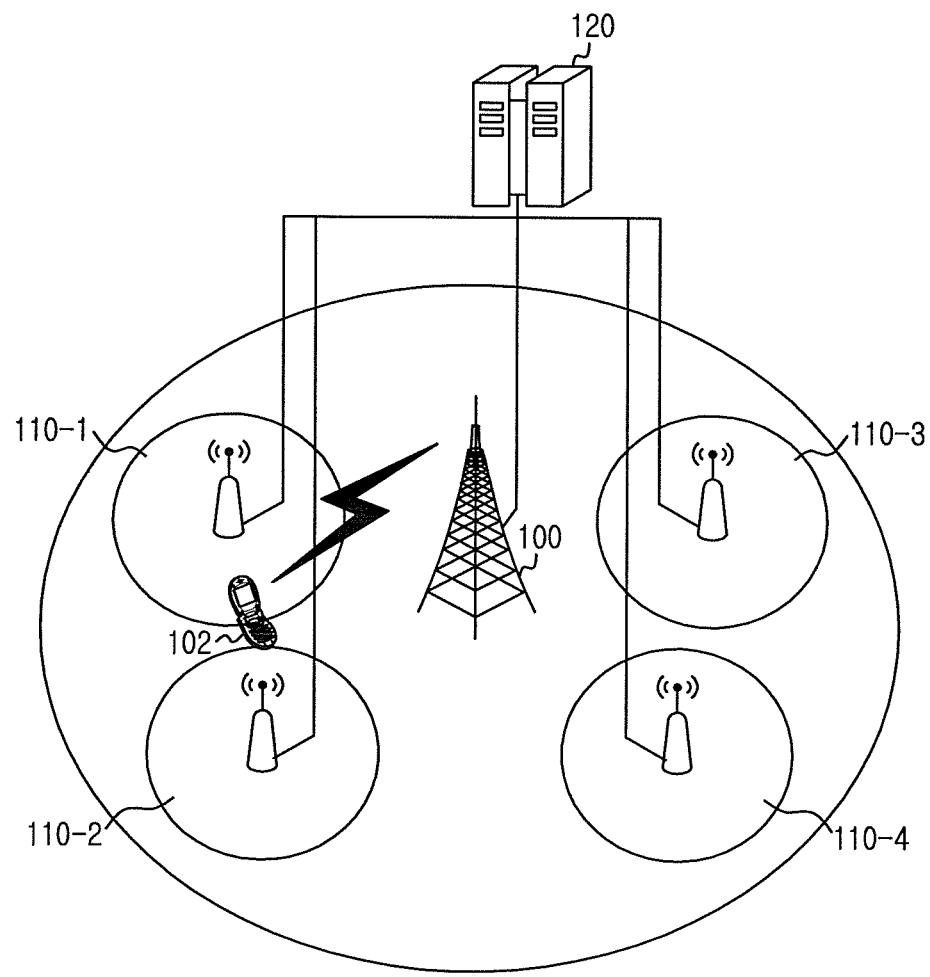
FIG. 1 illustrates a scheme of forming a virtual cell in a wireless communication system according to the conventional art.
Figure 2:
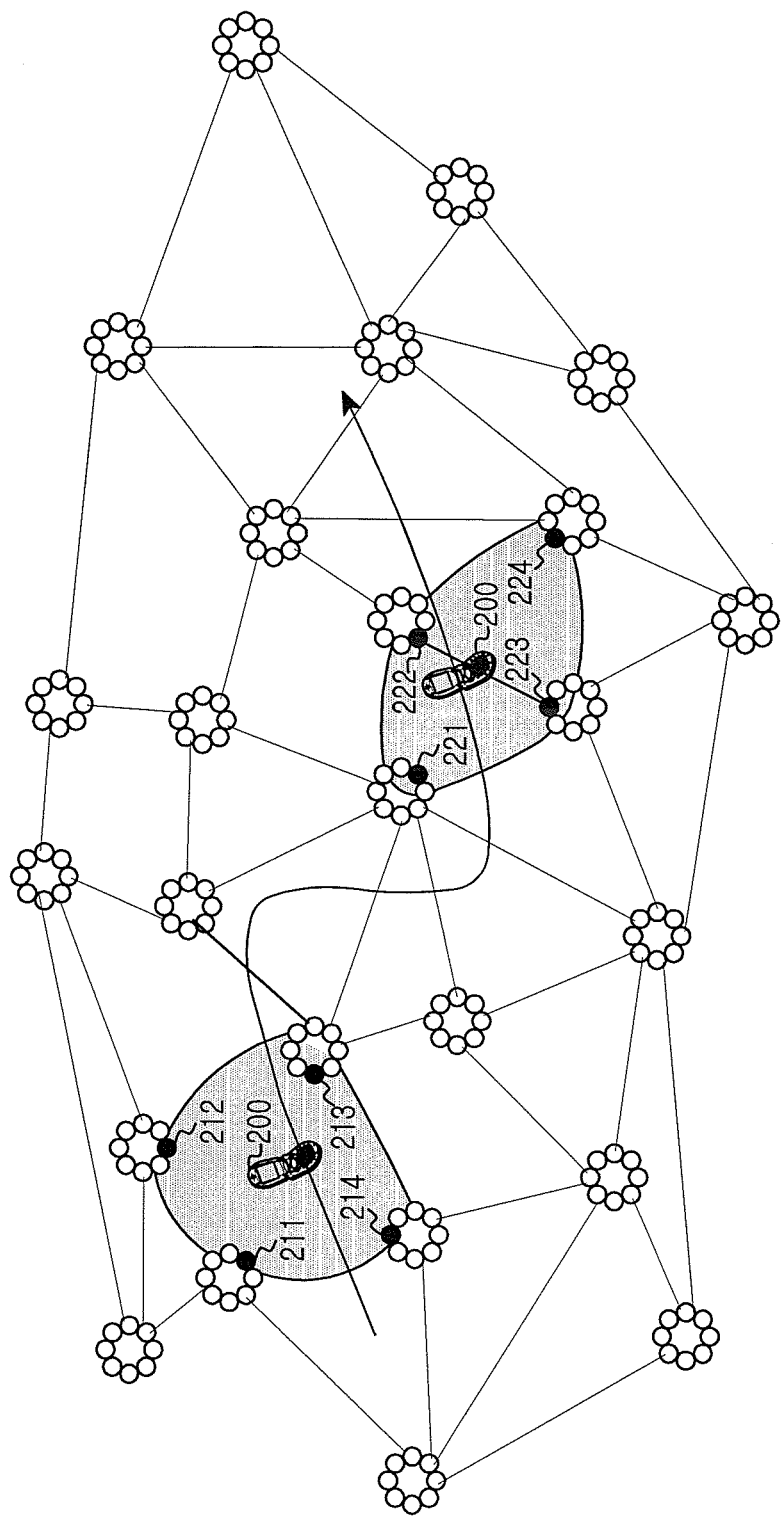
FIG. 2 illustrates a scheme of forming a virtual cell in a wireless communication system according to the present disclosure.

FIG. 2 illustrates a scheme of forming a virtual cell in a wireless communication system according to the present disclosure.

As illustrated in FIG. 2, in the present disclosure, neighboring BSs of a terminal 200 select beams 211 to 214 and 221 to 224 of good channel states with the terminal 200 and form virtual cells. On the basis of the selected beams 211 to 214 and 221 to 224, the neighboring BSs collaborate and communicate with the terminal 200. Particularly, instead of performing beam training about all beams and selecting a beam of a good channel state with the terminal 200, each of the neighboring BSs according to the present disclosure performs beam training about partial beams on the basis of previously stored information about a collaborative beam with a neighboring BS, and selects a beam of a good channel state with the terminal 200. Here, the collaborative beam means at least one beam of a neighboring BS having the overlapped coverage area regarding at least one beam of a specific BS. The collaborative beam is described below in detail with reference to FIGS. 3A to 3C.

Figure 3A:
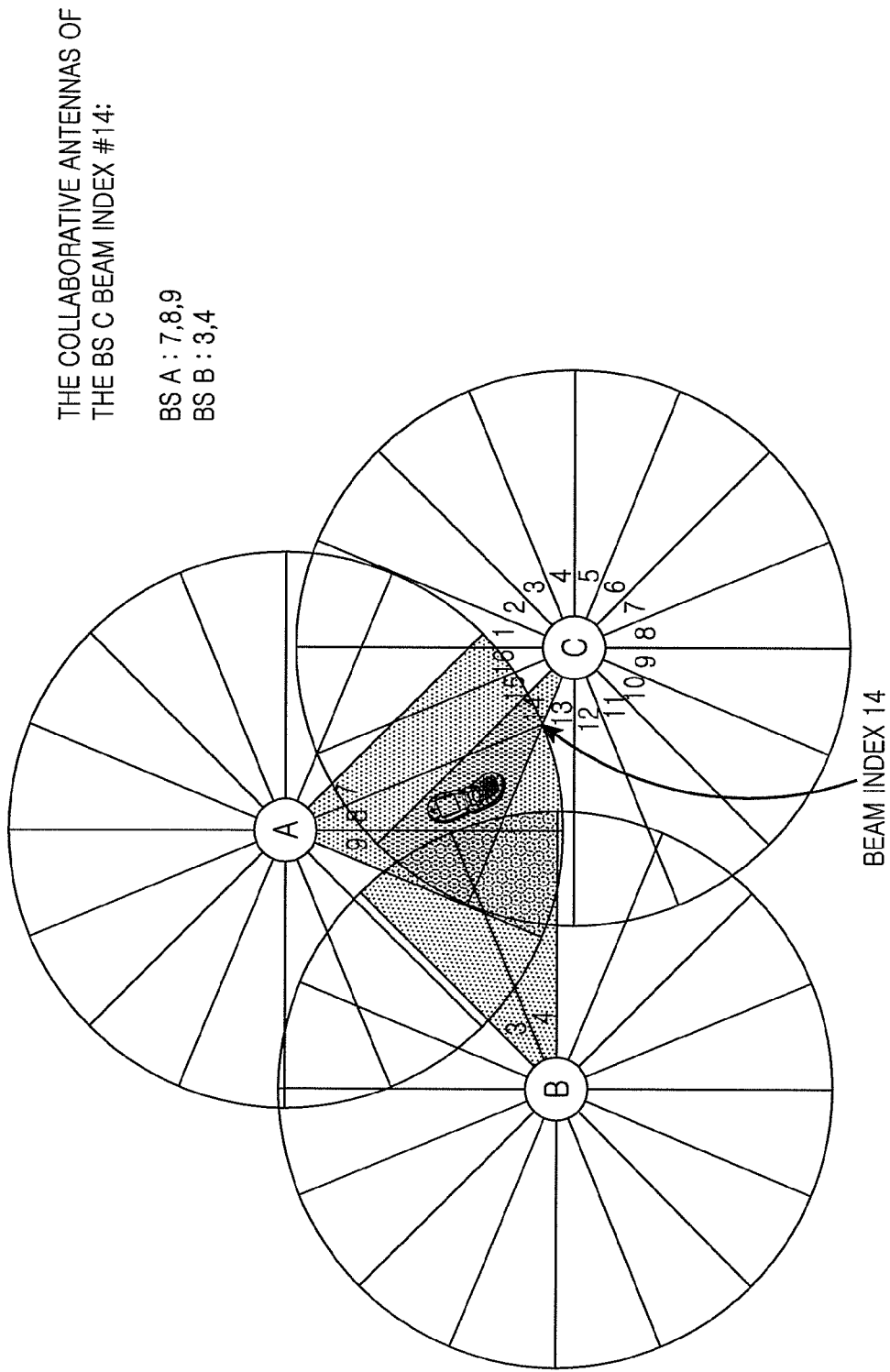
FIG. 3A to 3C illustrate a collaborative beam index between Base Stations (BSs) in a wireless communication system according to the present disclosure.
Figure 3B:
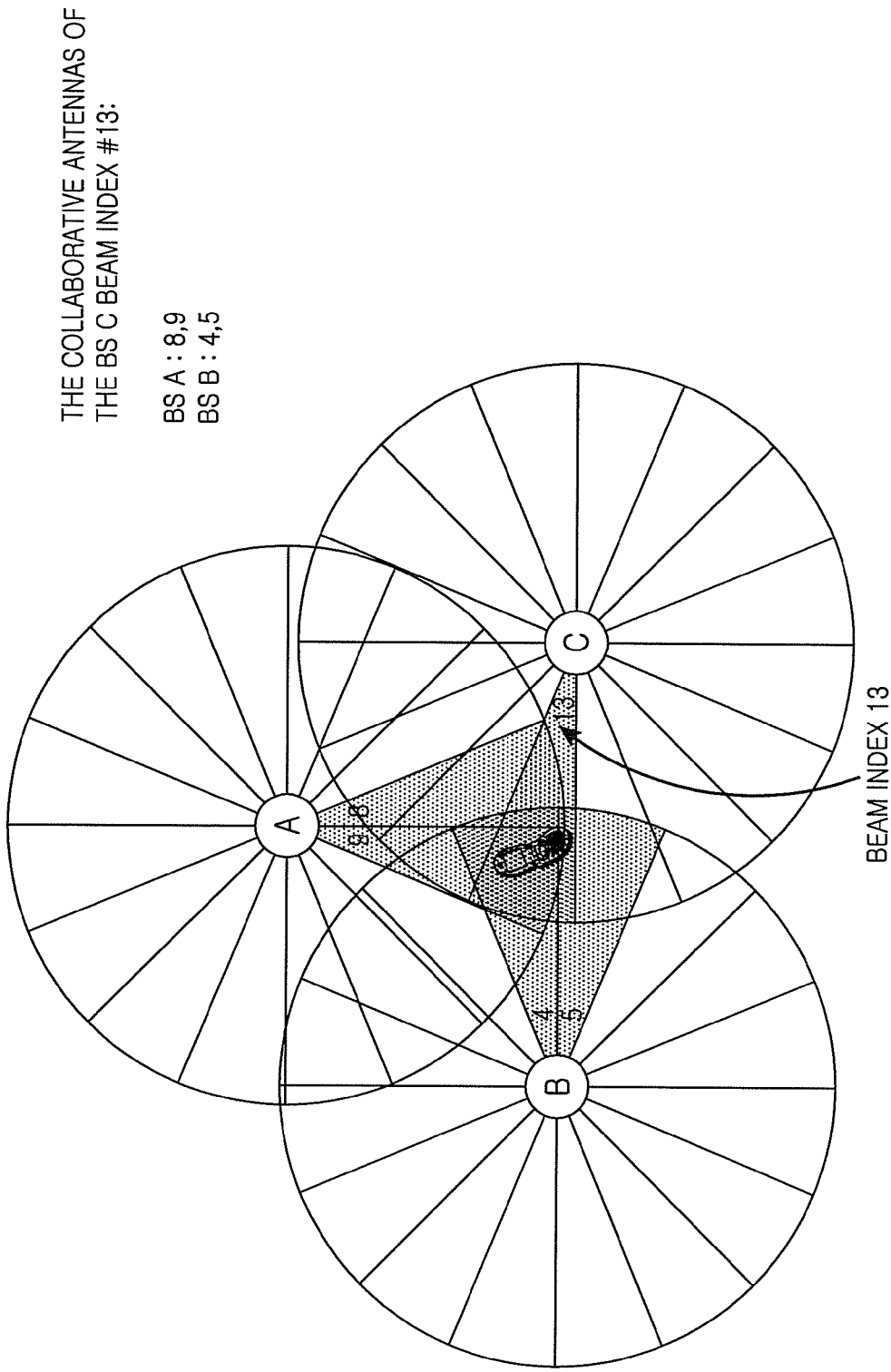
Figure 3C:
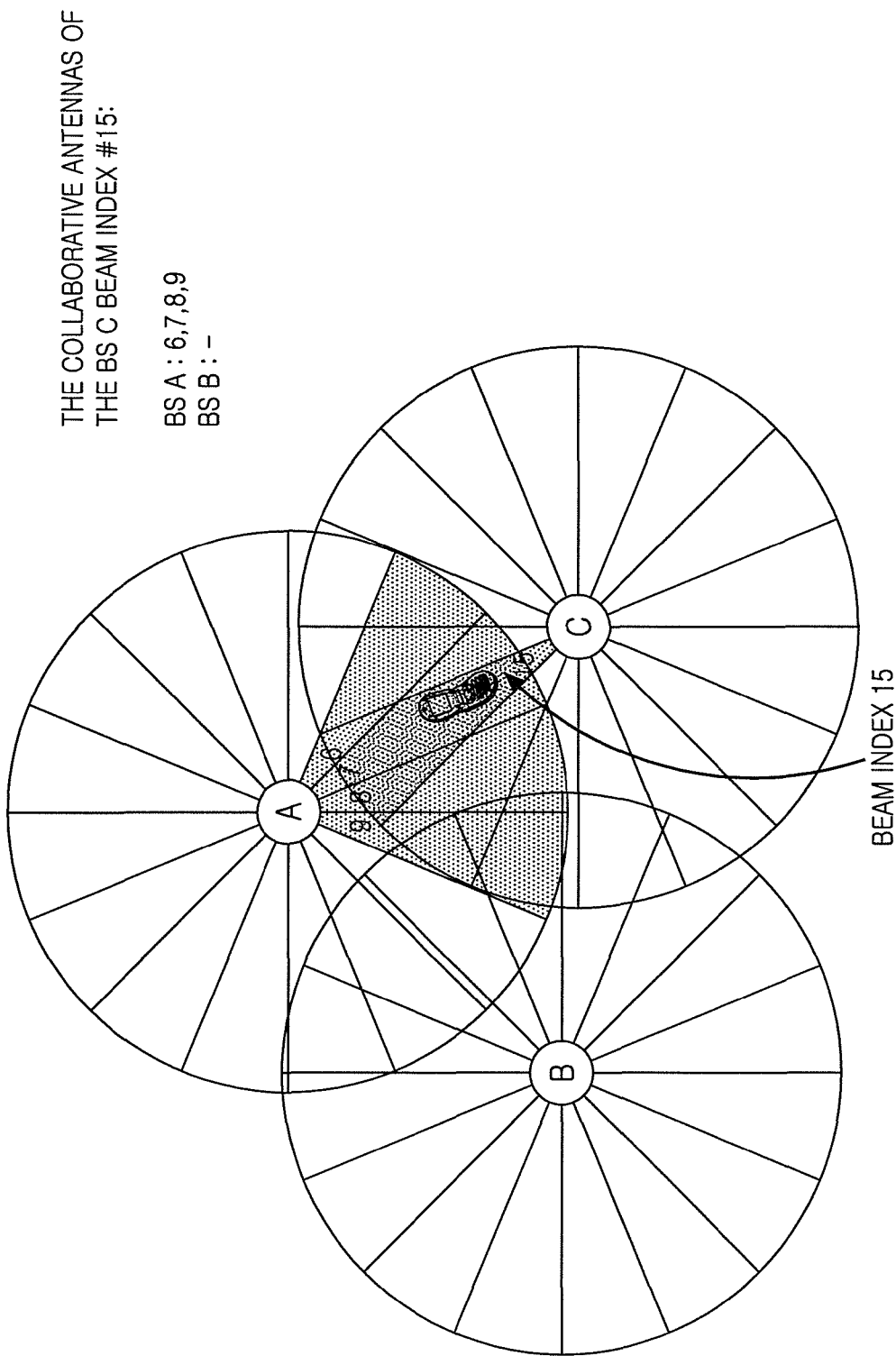

FIG. 3A to 3C illustrate, for example, a collaborative beam index between BSs in a wireless communication system according to the present disclosure.

As illustrated in FIGS. 3A to 3C, each BS is composed of a plurality of beams each having directivity. The coverage area of a specific beam of each BS can be overlapped with the coverage area of a specific beam of a neighboring BS. For instance, as illustrated in FIG. 3A, in a situation where each BS is composed of sixteen beams and an index of each beam is numbered from 1 to 16, a beam 14 among beams of a BS C can have the coverage area overlapped with those of beams 7, 8, and 9 of a BS A and beams 3 and 4 of a BS B. Accordingly, collaborative beams for the beam 14 of the BS C are the beams 7, 8, and 9 of the BS A and the beams 3 and 4 of the BS B. Similarly, as illustrated in FIG. 3B, collaborative beams for beam 13 among the beams of the BS C can be beams 8 and 9 of the BS A, and beams 4 and 5 of the BS B. And, as illustrated in FIG. 3C, collaborative beams for beam 15 among the beams of the BS C can be beams 6, 7, 8, and 9 of the BS A.

In the present disclosure, it is assumed that each BS has previously stored collaborative beam index information for each beam. The collaborative beam index information can be previously stored by a designer, or can be changed and stored by information fed back from a terminal. For instance, if the terminal feeds back beam index information of each BS, which receives a signal in a specific location, to a BS, the BS may be able to update the collaborative beam index information using the feedback information.

A scheme in which a BS forms a virtual cell using collaborative beam index information is described below.

FIGS. 4A to 4F illustrate an example of forming a virtual cell through beam training in a wireless communication system according to the present disclosure. Here, for the sake of description's convenience, a description is made assuming that, upon initial network access, a terminal selects a BS C and performs network access to the BS C.

As illustrated in FIG. 4A, first, a terminal selects a specific beam through beam training with a BS C for initial network access. Here, the beam training means a series of processes in which a BS and a terminal transmit/receive beam training reference signals each having different directivity through a plurality of beams, select a reference signal having the best quality of communication, and exchange beam information about the selected reference signal, i.e., beam index information. The beam training can be divided into downlink and uplink. That is, the beam training can be divided into downlink beam training and uplink beam training. In the downlink beam training, when the BS transmits a plurality of beam training reference signals to the terminal, the terminal selects one reference signal of a good signal quality and, in the uplink beam training, when the terminal transmits a plurality of beam training reference signals to the BS, the BS selects one reference signal of a good signal quality. In the present disclosure, this beam training aims at reducing the number of beams that are the subjects of beam training and simplifying the whole beam training procedure.

Figure 4B:
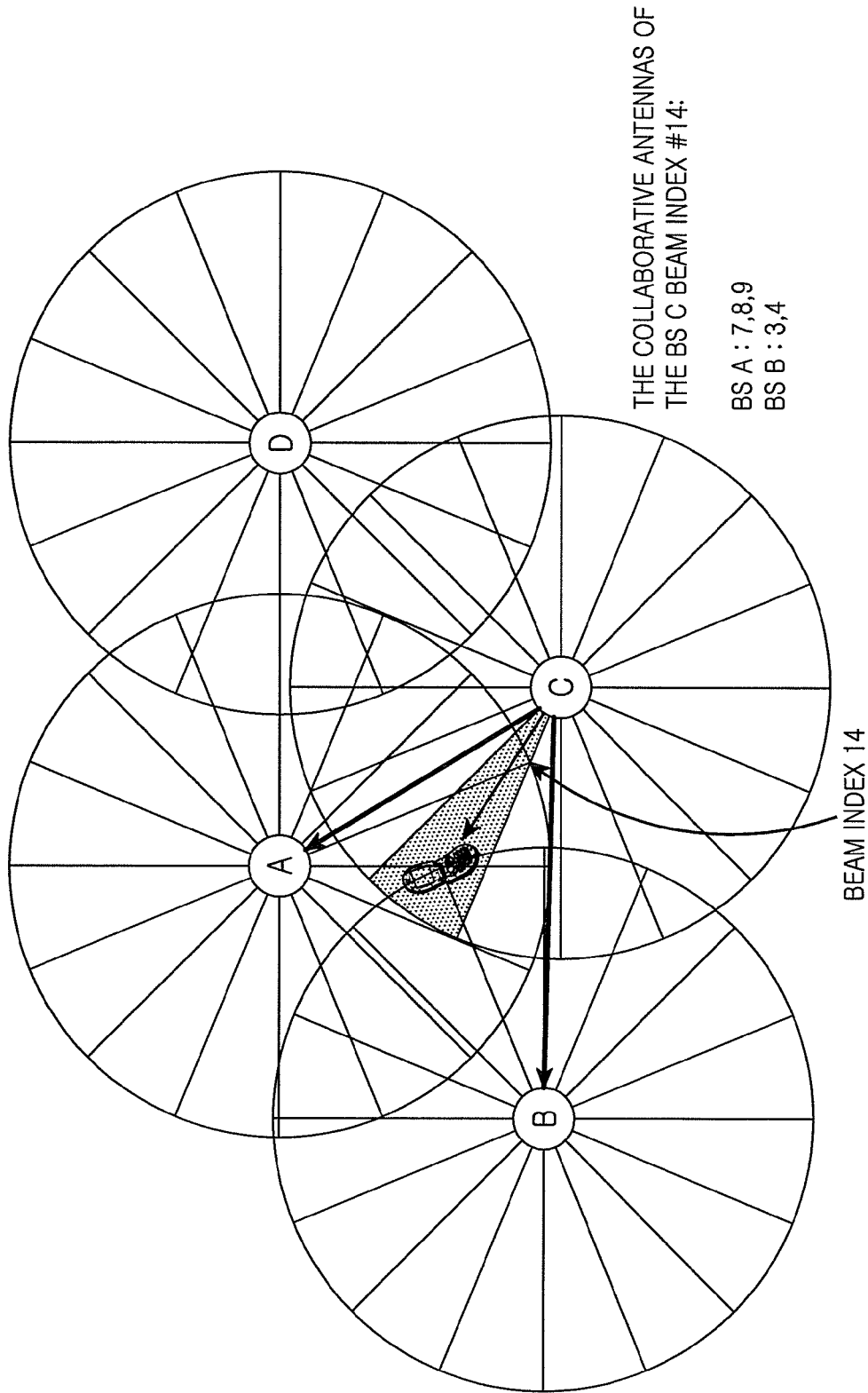

If the terminal performs beam training with the BS C and has access to the BS C through a beam 14 of the BS C, as illustrated in FIG. 4B, the BS C confirms that collaborative beams for the beam 14 are beams 7, 8, and 9 of a BS A and beams 3 and 4 of a BS B, and transmits information of the terminal and a signal, which represents that the terminal has accessed to the BS C through its own beam 14, to the BS A and the BS B.

Figure 4C:
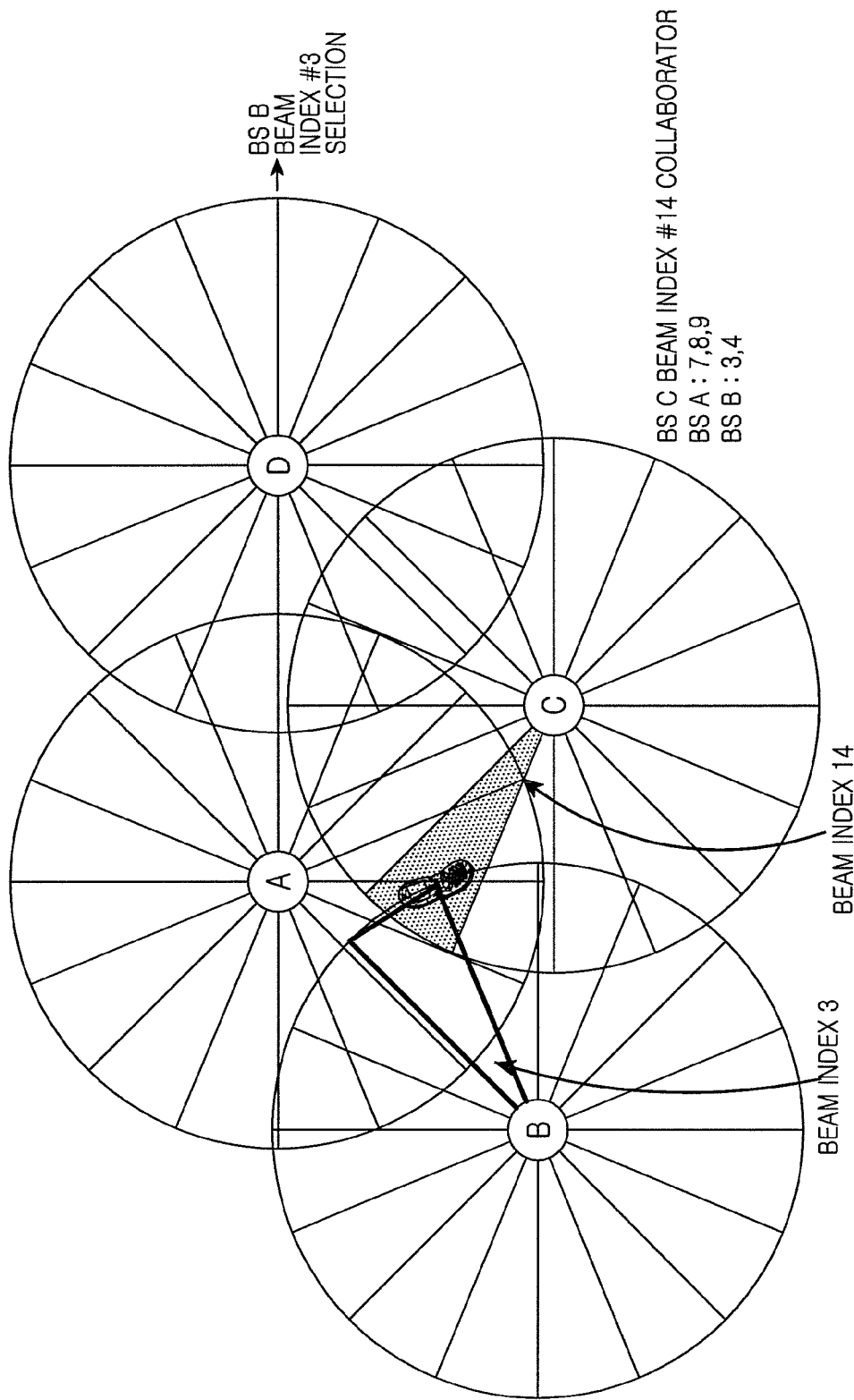
Figure 4D:
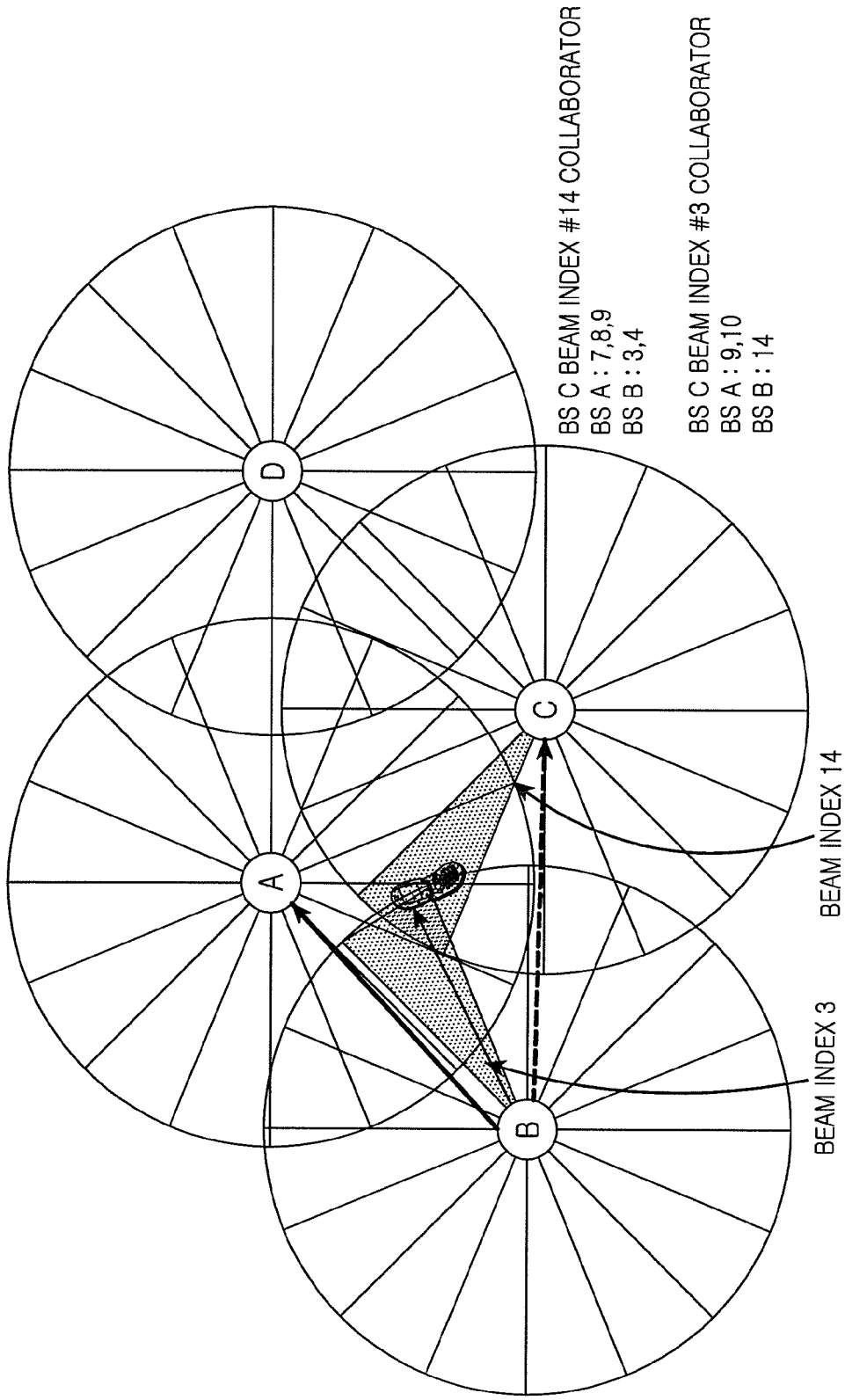

The BS B confirms its own beams 3 and 4 having the beam 14 of the BS C as a collaborative beam, and performs beam training with the terminal about the beams 3 and 4. That is, at the time of beam training with the terminal, instead of transmitting/receiving a beam training reference signal for all of its own beams, the BS B transmits/receives a reference signal only for the collaborative beam having the coverage area overlapped with that of the beam 14 of the BS C. When the beam 3 of the BS B is selected as a result of beam training between the BS B and the terminal as illustrated in FIG. 4C, the BS B transmits a signal, which represents that its own beam 3 has been selected, to the BS A and the BS C as illustrated in FIG. 4D.

Figure 4E:
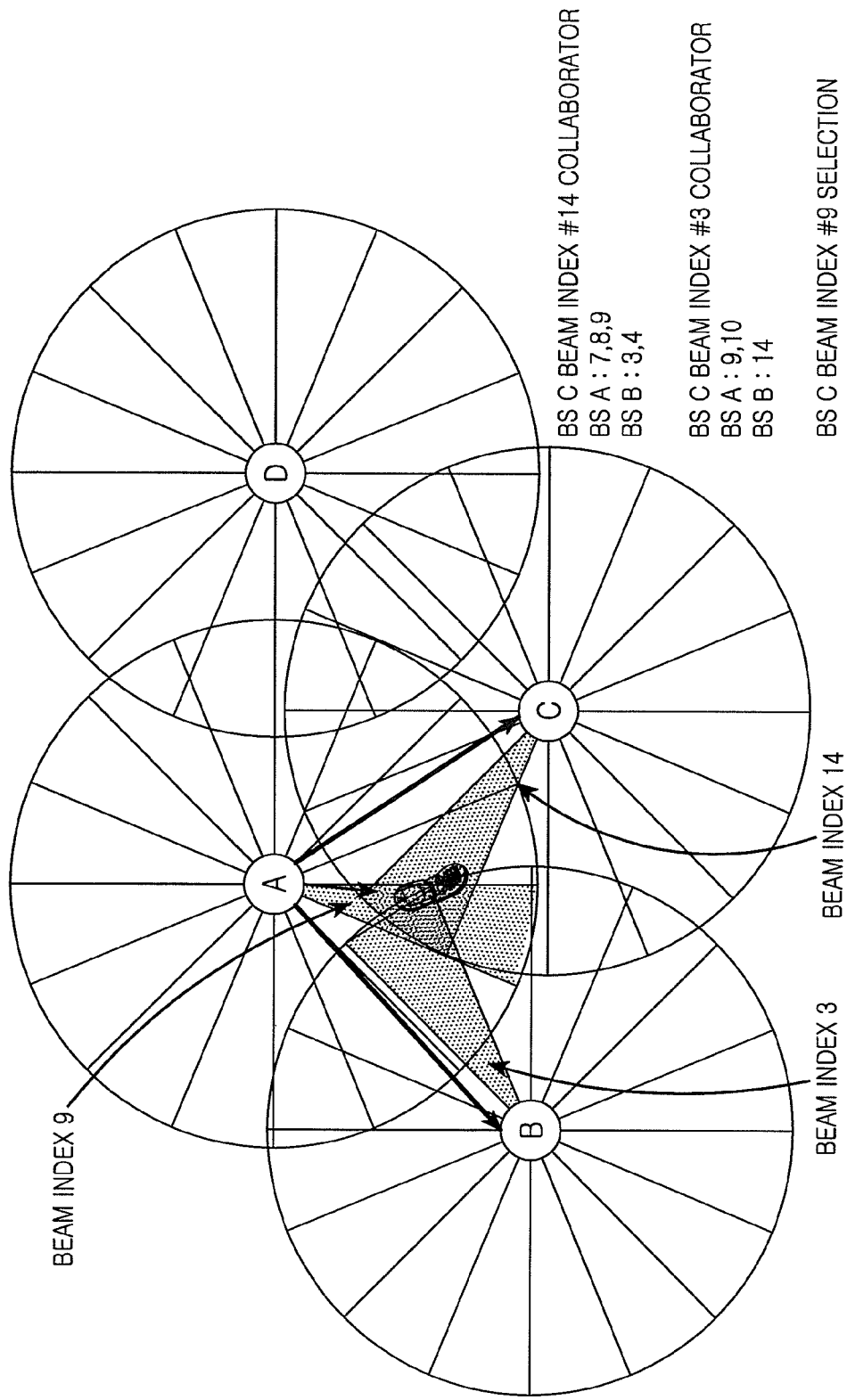

If so, the BS A confirms that its own beam having the beam 14 of the BS C and the beam 3 of the BS B as collaborative beams is a beam 9, performs beam training with the terminal about the beam 9 and selects the beam 9, and transmits a signal, which represents that its own beam 9 has been selected, to the BS B and the BS C as illustrated in FIG. 4E.

Figure 4F:
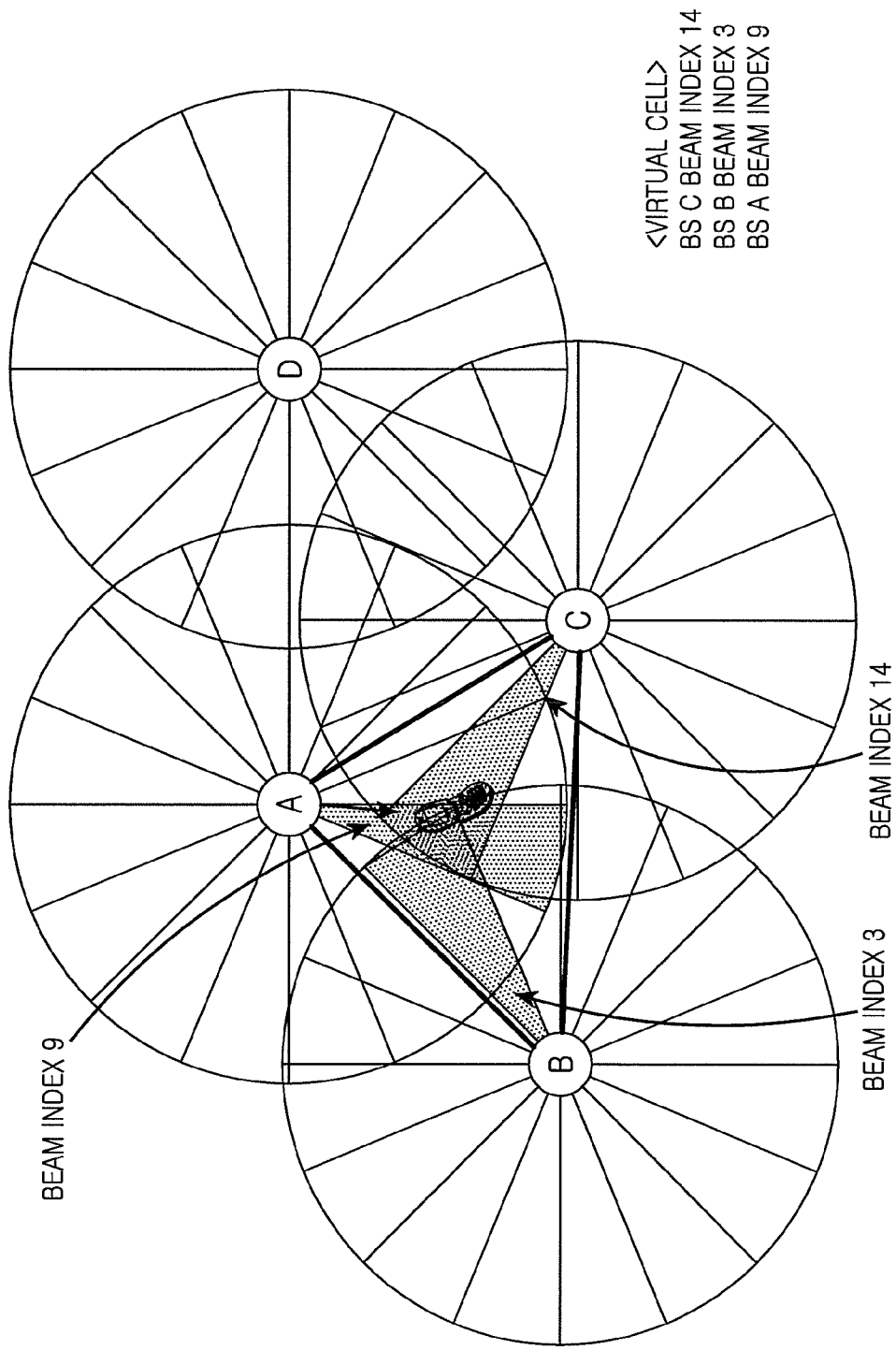

According to the aforementioned procedure, as illustrated in FIG. 4F, the BSs C, B, and A form a virtual cell for the terminal using each beams 14, 3, and 9 and perform communication in collaboration with one another.

The aforementioned description has been made in which the BS B first performs beam training among the BS B and the BS A having collaborative beams for the beam 14 of the BS C. This is to obtain the effect of, because the BS B has the fewer number of collaborative beams for the beam 14 of the BS C, when the BS B performs beam training before the BS C, simplifying the whole procedure of beam training carried out to form a virtual cell. In contrast, a BS having many collaborative beams may first perform beam training according to a design scheme. For this, the BS C schedules order of beam training of the BS B and the BS A, and transmits scheduling information to the BS B and the BS A. For another example, the order of the BSs performing the beam training may be determined on the basis of an intensity of a beam. The intensity of the beam can be determined by a feedback of a terminal in a cell-planning step. For instance, in the cell-planning step, the terminal receives a beam in a specific location, measures an intensity of the received beam, and reports the measured intensity to a BS, whereby the BS can acquire and store beam intensity information by location of the terminal. In an embodiment, on the basis of the acquired intensity information, the BS can determine the order of the BSs performing the beam training. Intensity information of a beam for each BS may be updated by the feedback of the terminal. For further example, the order of the BSs performing the beam training can be determined on the basis of a load of each BS. Here, load information of each BS can be exchanged and stored between BSs through a backhaul. For yet another example, the order of the BSs performing the beam training may be determined using two or more of the number of collaborative beams, an intensity of a beam, and a load.

Also, the present disclosure re-forms a virtual cell when a terminal moves after forming a virtual cell as described with reference to FIGS. 4A through 4F above.

Figure 5:
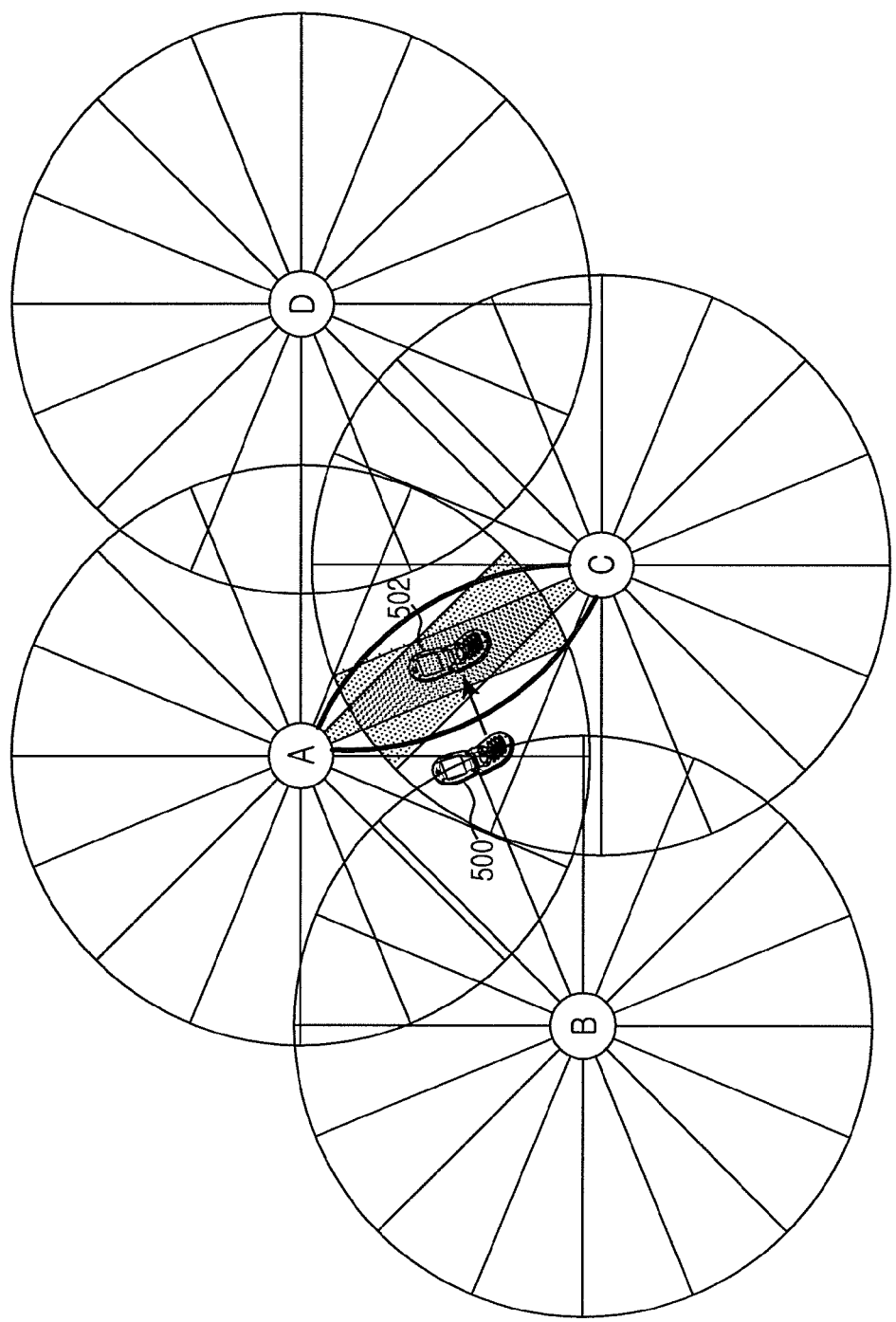
FIG. 5 illustrates a virtual cell changed according to a movement of a terminal in a wireless communication system according to the present disclosure.

FIG. 5 illustrates a virtual cell changed according to a movement of a terminal in a wireless communication system according to the present disclosure. That is, as illustrated in FIG. 5, when the terminal moves to a different location 502 in course of communicating through a virtual cell formed in a specific location 500, a BS C or BS A changes a beam for the terminal through beam tracking and re-forms a virtual cell using beam index information of a collaborative beam corresponding to the changed beam.

The aforementioned description has been made assuming that, when each BS performs beam training with the terminal, the beam training succeeds. However, the beam training may fail according to a channel situation.

Figure 6:
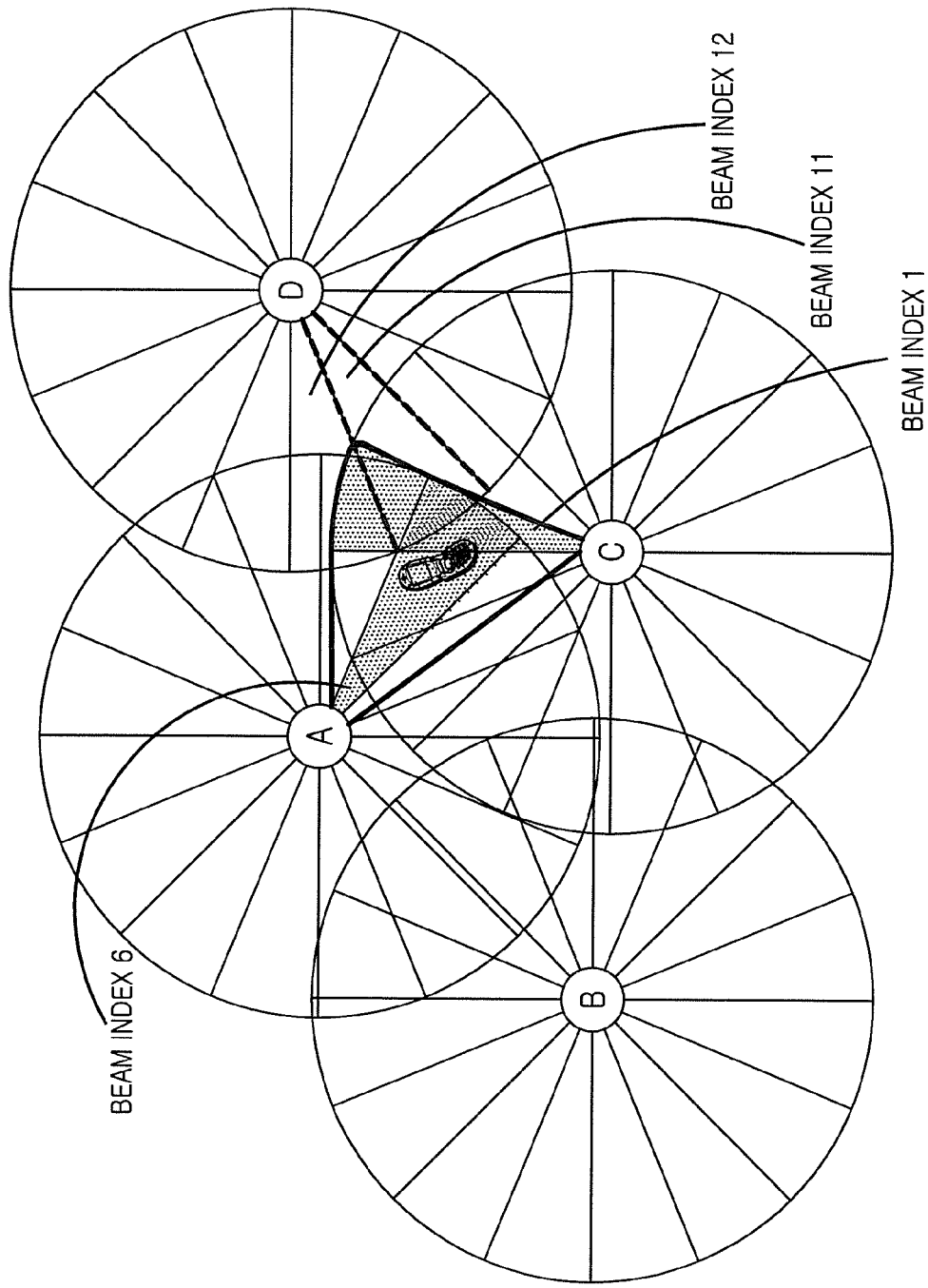
FIG. 6 illustrates a virtual cell formed upon a failure of beam training of a specific BS in a wireless communication system according to the present disclosure.

FIG. 6 illustrates a virtual cell formed upon a failure of beam training of a specific BS in a wireless communication system according to the present disclosure.

As illustrated in FIG. 6, assuming that a BS C and a BS A successfully perform beam training and select a beam 1 and a beam 6, respectively, a BS D can perform beam training with a terminal about a beam 11 having the beam 1 of the BS C and the beam 6 of the BS A as collaborative beams.

Here, in a situation where the BS D has transmitted a reference signal for the beam 11 to the terminal but the terminal fails to receive the reference signal because of a channel state with the terminal or its reception quality of the reference signal is poor, the terminal and the BS D can determine that the beam training fails. In this situation, the BS D may be able to re-attempt the beam training about the beam 11 after the lapse of a predetermined time, or perform beam training about other candidate collaborative beams, or give up virtual cell formation for the terminal. That is, the BS D can re-attempt the beam training about the beam 11 using a time point at which the terminal enters a slave mode after transmitting/receiving data in an active mode through a virtual cell formed with the beam 1 of the BS C and the beam 6 of the BS A. Also, the BS D may be able to perform beam training about its own beam having any one of the beam 1 of the BS C and the beam 6 of the BS A as a collaborative beam. For example, the BS D may be able to perform beam training about its own beam 12 having the beam 1 of the BS C as a collaborative beam.

A detailed operation and apparatus of a wireless communication system for forming a virtual cell on the basis of the aforementioned description are described below.

Figure 7:
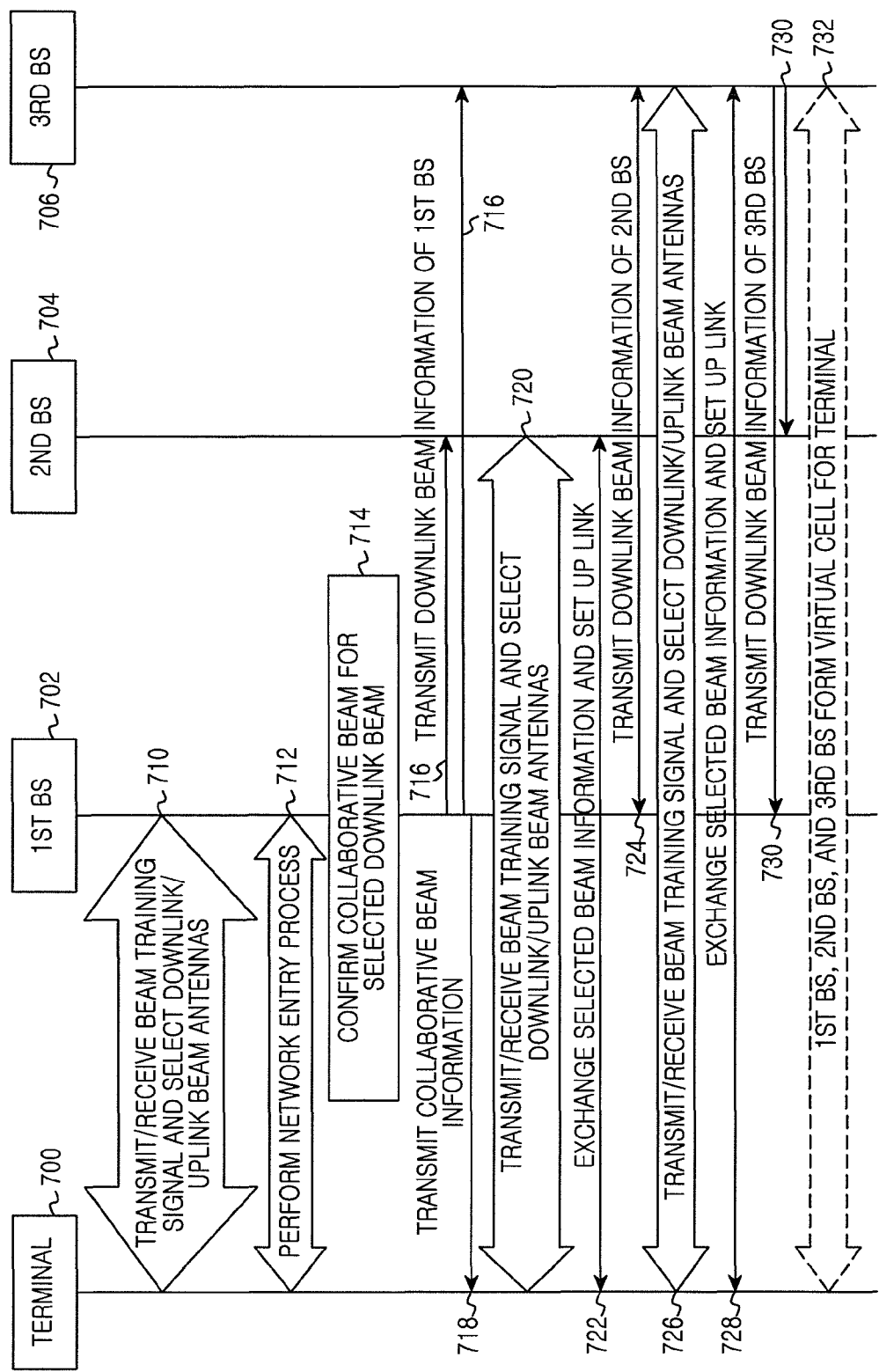
FIG. 7 illustrates a signal flow of forming a virtual cell in a wireless communication system according to the present disclosure.

FIG. 7 illustrates a signal flow of forming a virtual cell in a wireless communication system according to the present disclosure.

Referring to FIG. 7, in block 710, a terminal 700 and a first BS 702 transmit/receive a beam training signal (or a beam training reference signal) with each other and select one uplink beam and one downlink beam among a plurality of uplink beams and a plurality of downlink beams. In block 712, the terminal 700 and the first BS 702 perform a network access process for the terminal 700. That is, to select the downlink beam, if the first BS 702 transmits beam training reference signals each having different directivity to the terminal 700 through the plurality of beams, the terminal 700 measures signal qualities of the received reference signals and selects a beam corresponding to the reference signal having the best quality. Inversely, to select the uplink beam, if the terminal 700 transmits beam training reference signals each having different directivity to the first BS 702, the first BS 702 measures signal qualities of the received reference signals and selects a beam corresponding to the reference signal having the best quality. Here, the beam training reference signal transmitted by the first BS 702 can include information necessary for cell construction. Here, the description has been made in which, after performing the beam training, the terminal 700 and the first BS 702 perform a procedure of network access of the terminal 700. But, this can be changed according to a design scheme. For instance, the terminal 700 and the first BS 702 are able to perform the beam training in course of the network access procedure of the terminal 700, or the terminal 700 and the first BS 702 may be able to perform the beam training after performing the network access procedure. Also, beam information about the reference signal selected in each of the terminal 700 and the first BS 702 can be exchanged through any one process of block 710 and block 712 according to a design scheme. Here, the beam information includes an index of a corresponding beam.

After that, in block 714, the first BS 702 confirms collaborative beam information (e.g., collaborative beam index information) about the downlink beam corresponding to the reference signal selected by the terminal 700. Next, in block 716, the first BS 702 transmits information about the terminal and downlink beam information (e.g., downlink beam index information corresponding to the reference signal) to a second BS 704 and a third BS 706 having collaborative beams. After that, in block 718, the first BS 702 transmits information about the collaborative beams (or information of the second BS 704 and the third BS 706 being collaborative BSs) to the terminal 700. In an embodiment, the first BS 702 can schedule beam training execution time points of the second BS 704 and the third BS 706, and transmit scheduling information to the second BS 704, the third BS 706, and the terminal 700. In an embodiment, the first BS 702 may be able to receive a request for a beam training execution time point from each of the second BS 704 and the third BS 706, and perform the scheduling according to the requested beam training execution time point and the number of collaborative beams. Here, a description is made assuming that the first BS 702 performs scheduling such that the third BS 706 performs beam training after the second BS 704 performs beam training.

Next, in block 720, the terminal 700 and the second BS 704 transmit/receive a beam training signal with each other and select an uplink beam and a downlink beam. Next, in block 722, the terminal 700 and the second BS 704 exchange information about the selected beam and, on the basis of the exchanged information, set up a link for communication. In an embodiment, instead of performing beam training about all beams that the second BS 704 supports, the second BS 704 determines, as candidate beams, beams having a downlink beam of the first BS 702 as a collaborative beam, among all beams that itself supports, and performs beam training about the candidate beams. Next, in block 724, the second BS 704 transmits information about the downlink beam of the second BS 704 selected by the terminal 700, to the first BS 702 and the third BS 706.

After that, in block 726, the terminal 700 and the third BS 706 transmit/receive a beam training signal with each other and select an uplink beam and a downlink beam. Next, in block 728, the terminal 700 and the third BS 706 exchange information about the selected beam and, on the basis of the exchanged information, set up a link for communication. In an embodiment, instead of performing beam training about all beams that the third BS 706 supports, the third BS 706 determines, as candidate beams, beams having the downlink beam of the first BS 702 and the downlink beam of the second BS 704 as collaborative beams, among all beams that it supports, and performs beam training about the candidate beams. Next, in block 730, the third BS 706 transmits information about the downlink beam of the third BS 706 selected by the terminal 700, to the first BS 702.

After that, in block 732, the first BS 702, the second BS 704, and the third BS 706 form a virtual cell for the terminal 700 using the beams determined through the beam training, thereby communicating with the terminal 700 in collaboration with one another.

Figure 8A:
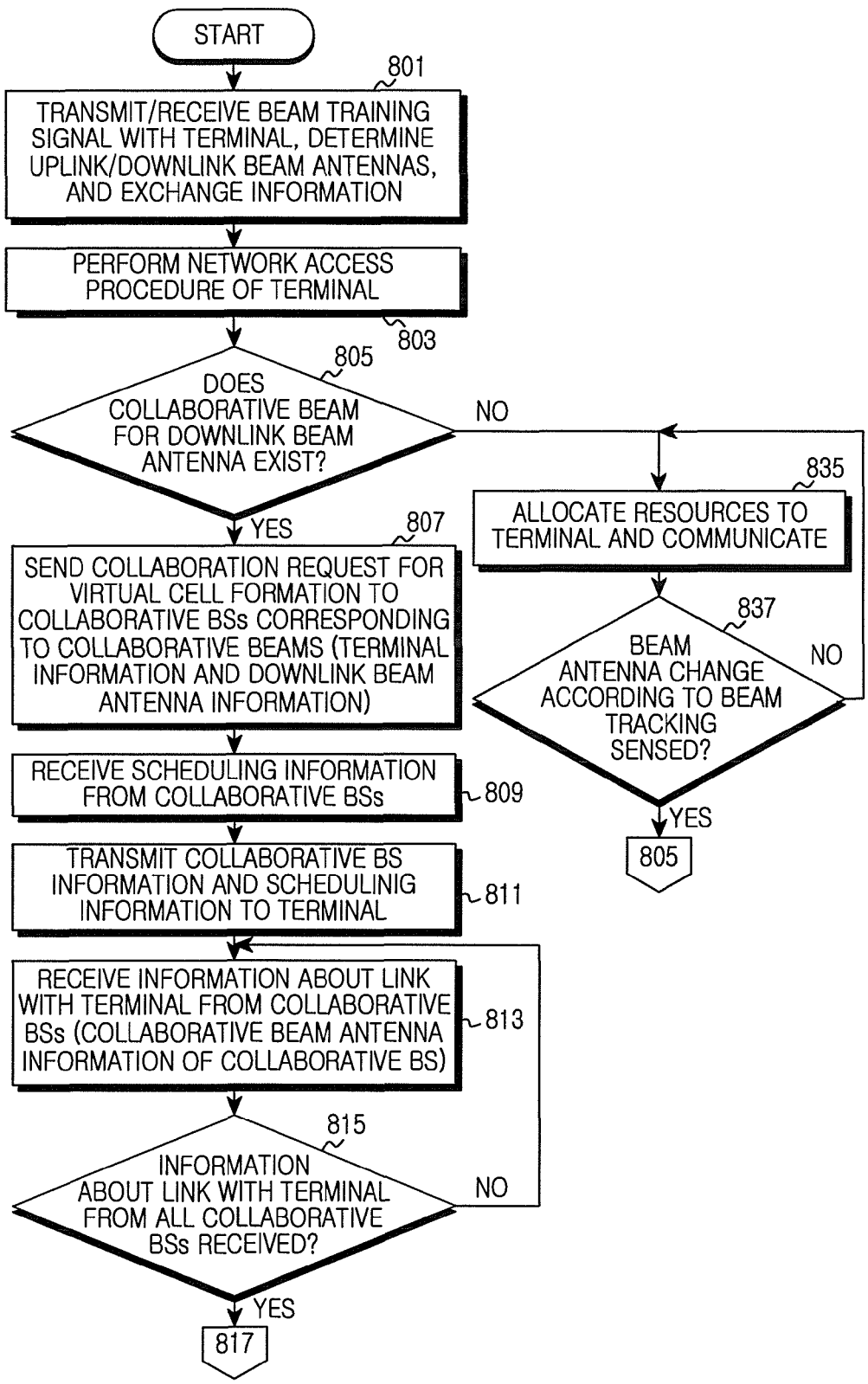
FIGS. 8A and 8B illustrate an operation procedure for virtual cell formation of a BS to which a terminal has initial access in a wireless communication system according to the present disclosure.
Figure 8B:
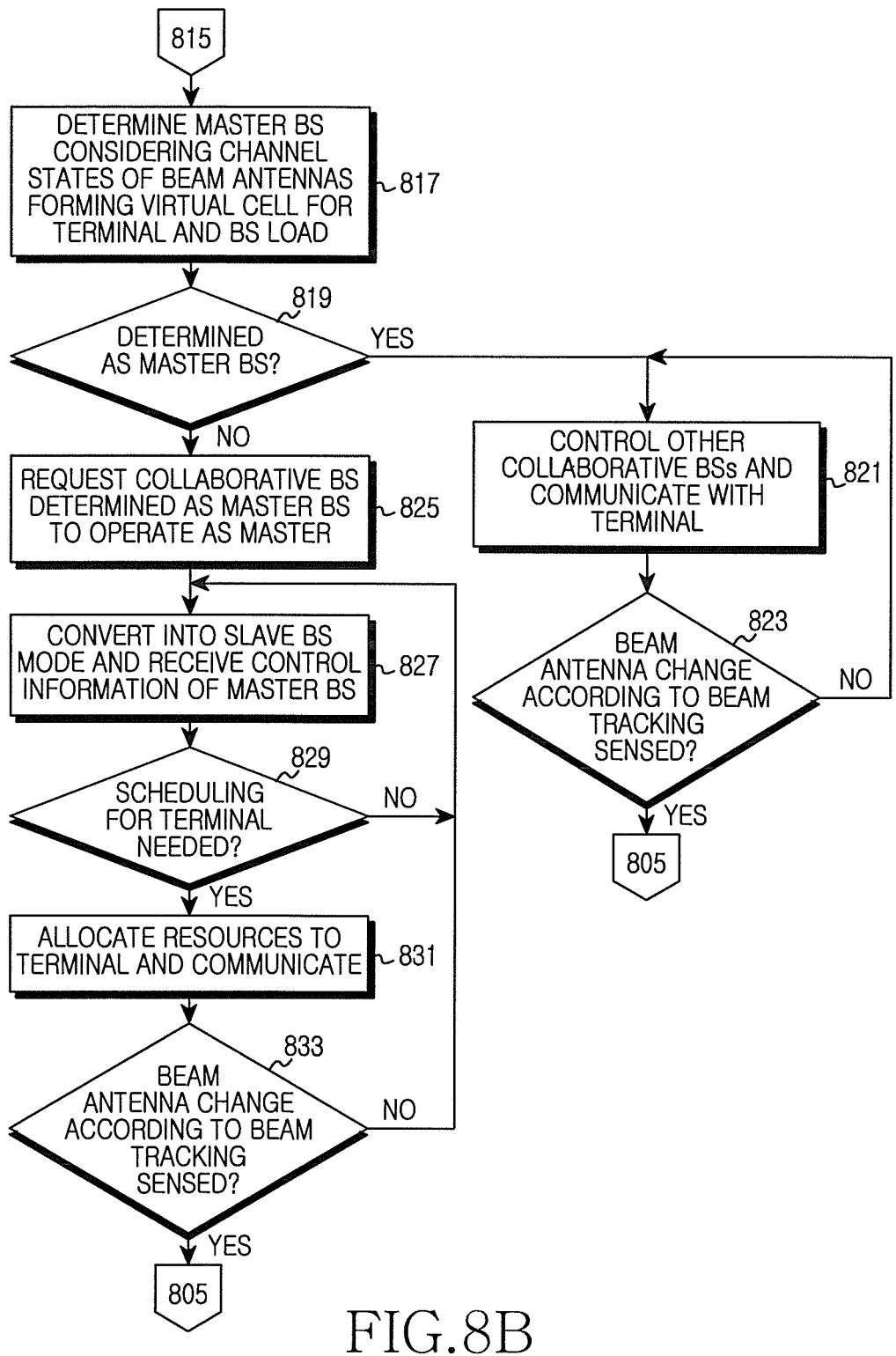

FIGS. 8A and 8B illustrate an operation procedure for virtual cell formation of a BS to which a terminal has initial access in a wireless communication system according to the present disclosure.

Referring to FIGS. 8A and 8B, in block 801, the BS transmits/receives a beam training signal with a terminal, determines an uplink beam and a downlink beam, and exchanges information about the determined beams with the terminal. After that, the BS proceeds to block 803 and performs a network access procedure for the terminal. Here, the BS transmits beam training reference signals each having different directivity to the terminal through a plurality of beams that the BS supports and then, receives information about the downlink beam of the BS that the terminal has selected, i.e., beam index information. Also, the BS receives a beam training reference signal transmitted by the terminal, selects an uplink beam of the best signal quality, and transmits index information about the selected uplink beam to the terminal. In an embodiment, the beam training reference signal transmitted from the BS to the terminal can include index information about a corresponding beam and information necessary for cell construction.

Next, the BS proceeds to block 805 and determines if a collaborative beam for the downlink beam of the BS exists. That is, the BS has previously stored, as collaborative beam index information, index information about a beam of a neighboring BS having the overlapped coverage regarding a plurality of beams that the BS supports. Accordingly, through the previously stored collaborative beam index information, the BS can be aware whether the collaborative beam for the downlink beam of the BS exists.

When it is determined in block 805 that the collaborative beam for the downlink beam of the BS does not exist, the BS recognizes that it is a situation not capable of forming a virtual cell and proceeds to block 835 and allocates resources to the terminal, and performs communication with the terminal. After that, in block 837, the BS determines if the terminal is moved and the beam is changed according to beam tracking. For instance, when a channel environment condition with the terminal becomes less than a threshold condition during communication through the downlink beam, the BS can again perform beam training for the terminal and perform beam tracking for re-determining a beam. In an embodiment, when the downlink beam for the terminal is changed, the BS can recognize that the downlink beam is changed due to the movement of the terminal. When it is determined in block 837 that the beam is changed according to the beam tracking, the terminal returns to block 805. When it is determined in block 837 that the beam is not changed according to the beam tracking, the terminal returns to block 835 and continuously performs communication with the terminal.

In contrast, when it is determined in block 805 that the collaborative beam for the downlink beam of the BS exists, the BS proceeds to block 807 and sends a collaboration request for virtual cell formation to collaborative BSs corresponding to collaborative beams. In an embodiment, the BS transmits information of the terminal and index information of its own downlink beam determined in block 801, to the collaborative BSs.

Next, in block 809, the BS receives scheduling information for beam training from the collaborative BSs. Here, the scheduling information for the beam training represents information about resources that the collaborative BSs will use at the time of beam training with the terminal.

In block 811, the BS sends a response message to the received scheduling information to the collaborative BSs, and transmits information about the collaborative BSs and the scheduling information to the terminal. In an embodiment, on the basis of the scheduling information received from each collaborative BS, the BS can schedule resources that the respective collaborative BSs will use for performing beam training with the terminal and then, transmit scheduled resource information to the collaborative BSs and the terminal. Here, the BS can schedule the resources that the respective collaborative BSs will use for performing the beam training with the terminal, in consideration of the number of collaborative beams that the respective collaborative BSs have for the downlink beam determined in block 801. Also, when the scheduling information received from the plurality of collaborative BSs indicates the same resources, the BS may send the plurality of collaborative BSs a response message that supports only Not ACKnowledgement (NACK) information indicating that corresponding scheduling cannot be permitted. In this situation, block 809 and block 811 will be repeatedly carried out until the BS permits the scheduling information of the plurality of collaborative BSs.

Next, in block 813, the BS receives information about links with the terminal from the collaborative BSs. In an embodiment, the information about the links with the terminal includes uplink beam information and downlink beam information having formed the links between the collaborative BSs and the terminal. After that, in block 815, the BS determines if it has received the information about the links with the terminal from all the collaborative BSs. When it is determined in block 815 that the information about the links with the terminal are not received from all the collaborative BSs, the BS returns to block 813 and waits to receive the information about the link with the terminal from the collaborative BS.

In contrast, when it is determined in block 815 that the information about the link with the terminal are received from all the collaborative BSs, the BS forms a virtual cell for the terminal on the basis of the beam information received from the collaborative BSs. Next, in block 817, the BS determines a master BS for the virtual cell considering channel states of beams forming the virtual cell and a BS load. Here, the master BS means a BS playing a role of controlling other BSs constituting the virtual cell for the sake of the improvement of a communication quality of the terminal.

Next, in block 819, the BS determines if it has been determined as the master BS. If it is determined in block 819 that the BS itself has been determined as the master BS, the BS proceeds to block 821 and controls other collaborative BSs constituting the virtual cell and performs communication with the terminal. Next, the BS proceeds to block 823 and determines if the terminal is moved and the beam is changed according to the beam tracking. When it is determined in block 823 that the beam is changed according to the beam tracking, the BS returns to block 805 and again performs the subsequent blocks. When it is determined in block 823 that the beam is not changed according to the beam tracking, the BS returns to block 821 and controls the collaborative BSs and continuously performs communication with the terminal.

In contrast, when it is determined in block 819 that the BS has not been determined as the master BS, the BS proceeds to block 825 and requests a collaborative BS determined as the master BS to operate as the master BS. Next, the BS proceeds to block 827 and converts into a slave BS mode and then, receives control information from the master BS. Here, the control information represents scheduling information for communication with the terminal.

Next, in block 829, the BS determines if the BS itself needs to allocate resources to the terminal, that is, needs to schedule the resources for communication according to the control information. Here, when determined in block 829 that the BS does not need to perform scheduling for the terminal according to the control information, the BS returns to block 827 and again performs the subsequent blocks. In contrast, when it is determined in block 829 that the BS needs to perform the scheduling for the terminal according to the control information, the BS proceeds to block 831 and allocates resources to the terminal and communicates with the terminal. Next, in block 833, the BS determines if the terminal is moved and the beam is changed according to the beam tracking. When it is determined in block 833 that the beam is changed according to the beam tracking, the BS returns to block 805 and again performs the subsequent blocks. In contrast, when it is determined in block 833 that the beam is not changed according to the beam tracking, the BS returns to block 827 and again performs the subsequent blocks.

Figure 9A:
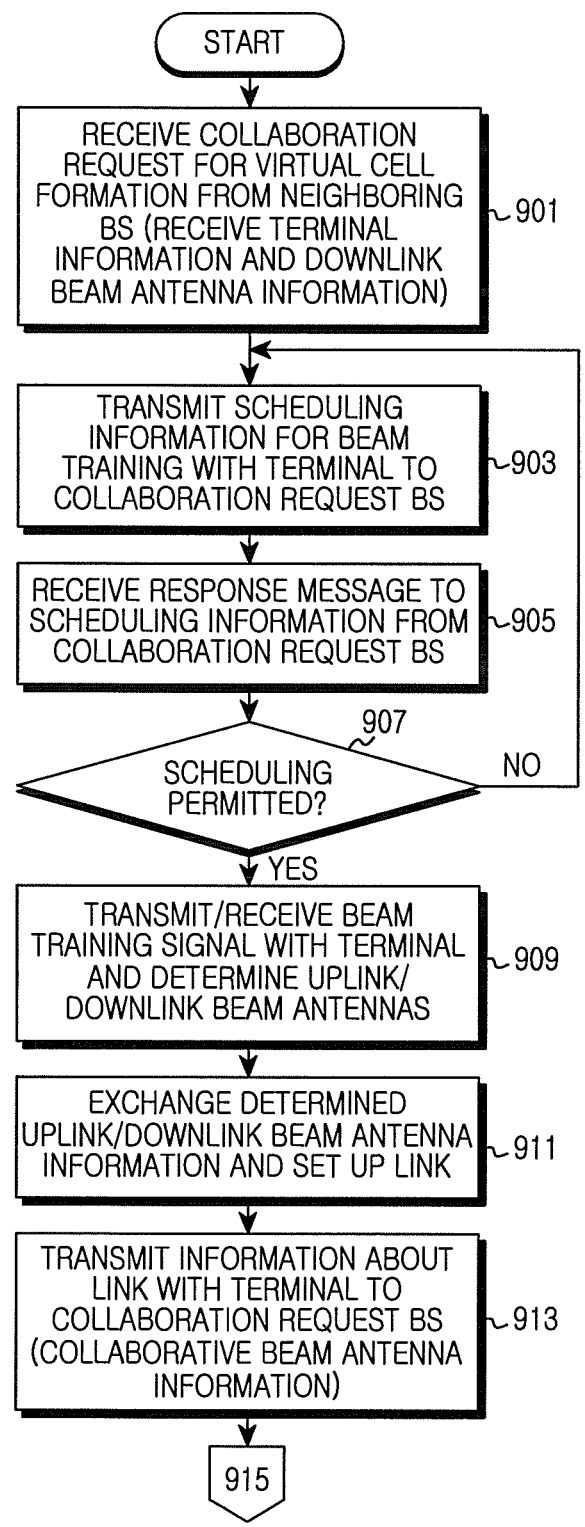
FIGS. 9A and 9B illustrate an operation procedure for virtual cell formation of a neighboring BS in a wireless communication system according to the present disclosure.
Figure 9B:
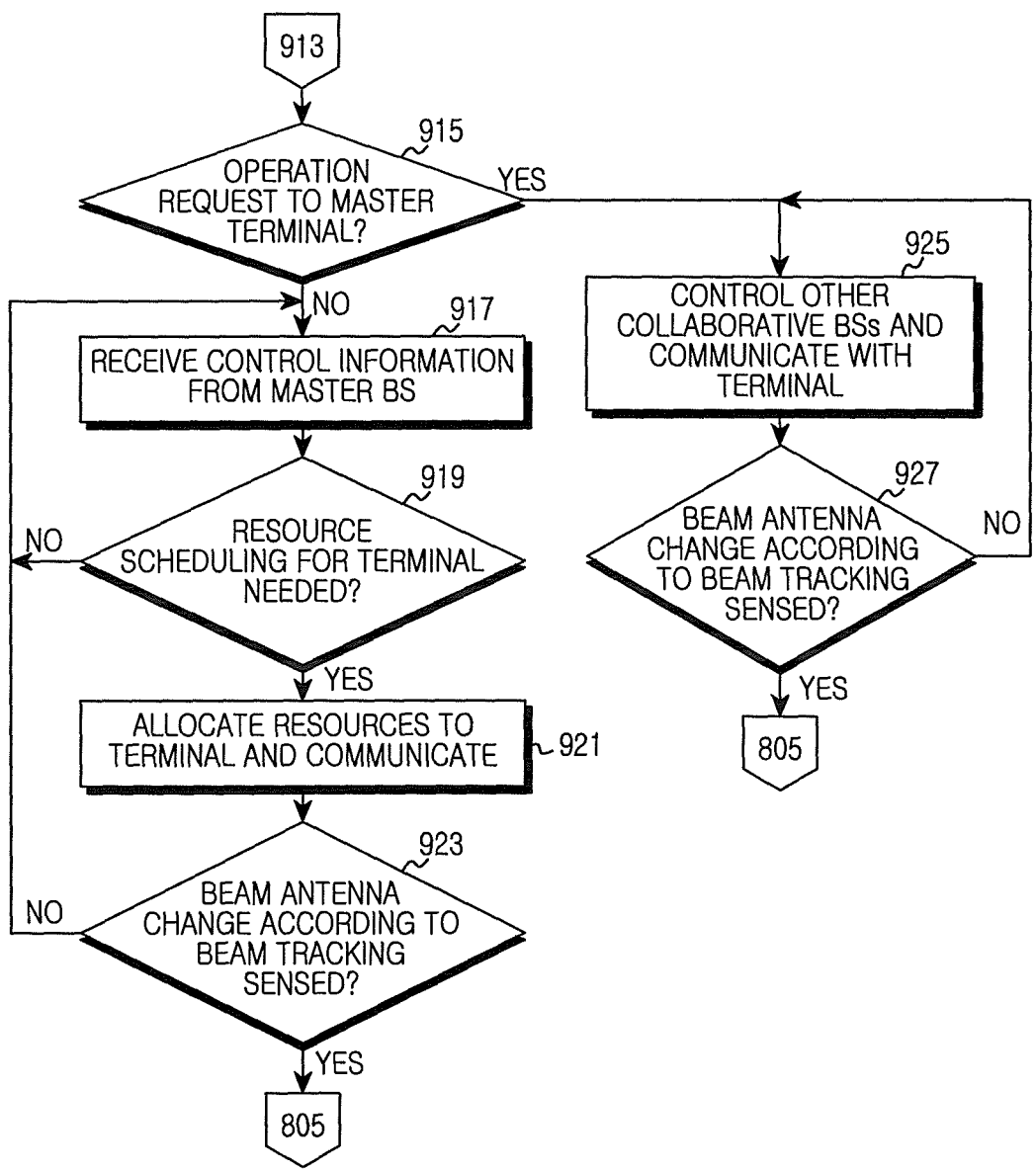

FIGS. 9A and 9B illustrate an operation procedure for virtual cell formation of a neighboring BS in a wireless communication system according to the present disclosure.

Referring to FIGS. 9A and 9B, in block 901, the neighboring BS receives a signal representing a collaboration request for virtual cell formation, from a neighboring BS. In an embodiment, the collaboration request signal for the virtual cell formation includes index downlink beam information about a link between a collaborative BS and a terminal and information about the terminal. Below, for the sake of description's convenience, the neighboring BS sending the collaboration request for the virtual cell formation is called a collaboration request BS.

Next, in block 903, the neighboring BS creates scheduling information for beam training with the terminal, and transmits the created scheduling information to the collaboration request BS. Here, the scheduling information for the beam training represents information about resources that the neighboring BS intends to use at the time of beam training with the terminal.

After that, in block 905, the neighboring BS receives a response message to the scheduling information from the collaboration request BS, and proceeds to block 907 and determines if the collaboration request BS permits scheduling. When it is determined in block 907 that the collaboration request BS does not permit the scheduling, the neighboring BS returns to block 903 and re-schedules the resources that the neighboring BS intends to use for the beam training, transmits re-scheduling information to the collaboration request BS, and again performs the subsequent blocks.

In contrast, when it is determined in block 907 that the collaboration request BS permits the scheduling, the neighbor BS proceeds to block 909 and transmits/receives a beam training signal with the terminal and determines an uplink beam and a downlink beam. In an embodiment, instead of performing beam training about all beams that it supports, the neighboring BS determines, as candidate beams, beams having a downlink beam of the collaboration request BS as a collaborative beam, performs beam training about the candidate beams, and determines the uplink beam and the downlink beam. After that, in block 911, the neighboring BS exchanges beam index information about the determined uplink beam and downlink beam with the terminal and, on the basis of the exchanged information, sets up a link for communication with the terminal.

Next, the neighboring BS proceeds to block 913 and transmits information about the link with the terminal to the collaboration request BS. In an embodiment, the information about the link can include downlink beam index information about the link between the neighboring BS and the terminal, time information about the link connection, information of the neighboring BS and authentication information and the like. In an embodiment, the neighboring BS can transmit information about the link with the terminal to at least one different neighboring BS according to the control of the collaboration request BS. In an embodiment, the different neighboring BS represents a BS having the downlink beam of the collaboration request BS as the collaborative beam.

Next, the neighboring BS proceeds to block 915 and determines if a signal requesting a master BS to operate is received from the collaboration request BS. When it is determined in block 915 that the signal requesting the master BS to operate is not received, the neighboring BS proceeds to block 917 and receives control information from the master BS of a virtual cell for the terminal. Next, the neighboring BS proceeds to block 919 and determines if the neighboring BS itself has a need to allocate resources to the terminal, that is, has a need to schedule the resources for communication according the control information. Here, when it is determined in block 919 that there is not a need to perform the scheduling for the terminal according to the control information, the neighboring BS returns to block 917 and again performs the subsequent blocks. In contrast, when it is determined in block 919 that there is a need to perform the scheduling for the terminal according to the control information, in block 921, the neighboring BS allocates resources to the terminal and communicates with the terminal. Next, in block 923, the neighboring BS determines if the terminal is moved and the beam is changed according to beam tracking. When it is determined in block 923 that the beam is changed according to the beam tracking, the neighboring BS goes to block 805 of FIG. 8 and again performs the subsequent blocks of FIG. 8. When it is determined in block 923 that the beam is not changed according to the beam tracking, the neighboring BS returns to block 917 and again performs the subsequent blocks.

In contrast, when it is determined in block 915 that the signal requesting the master BS to operate is received, the neighboring BS proceeds to block 925 and controls other collaborative BSs constituting the virtual cell and performs communication with the terminal. Next, the neighboring BS proceeds to block 927 and determines if the terminal is moved and the beam is changed according to the beam tracking. When it is determined in block 927 that the beam is changed according to the beam tracking, the neighboring BS goes to block 805 of FIG. 8 and again performs the subsequent blocks of FIG. 8. When it is determined in block 927 that the beam is not changed according to the beam tracking, the neighboring BS returns to block 925 and controls the collaborative BSs and continuously performs communication with the terminal.

Figure 10:
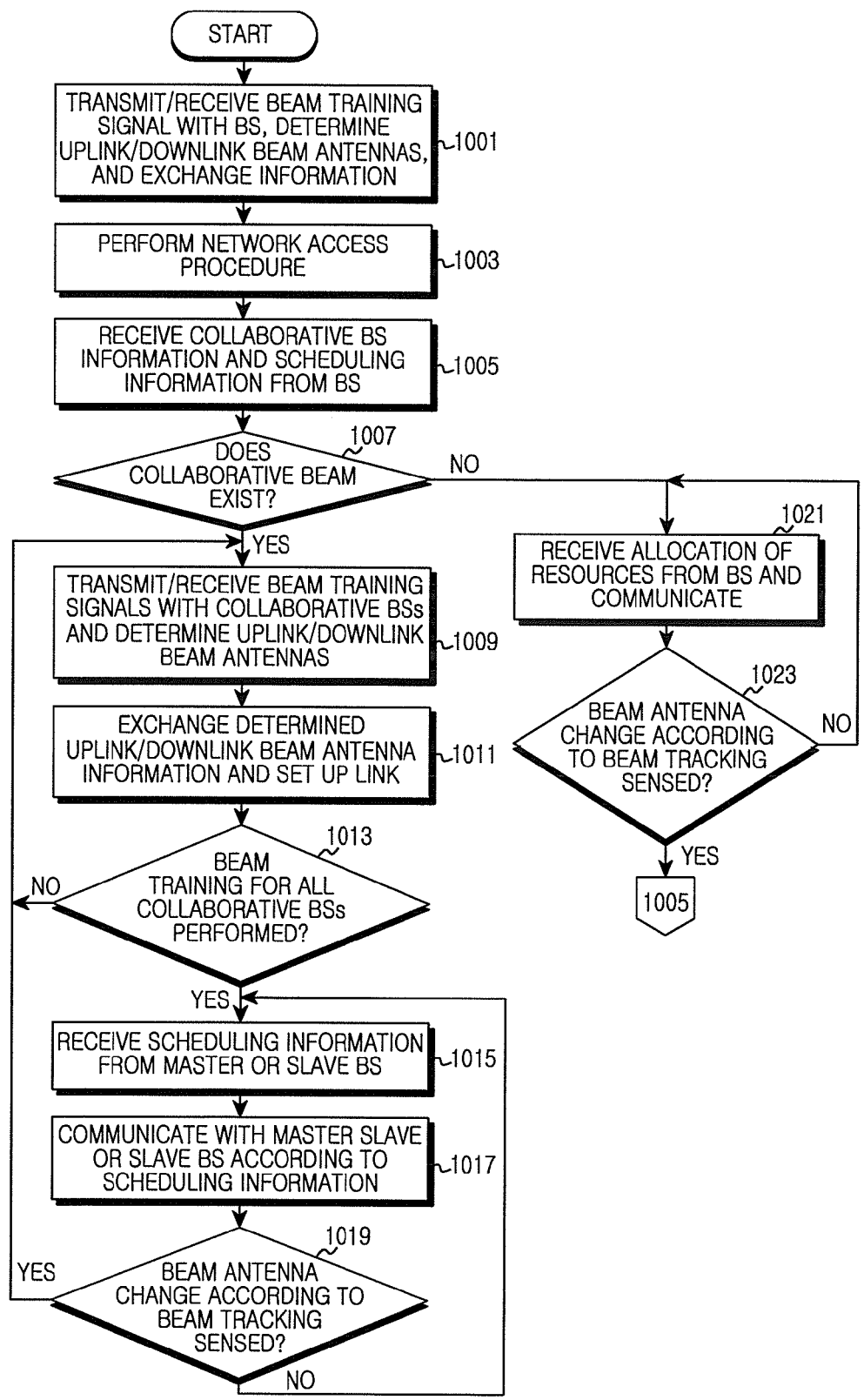
FIG. 10 illustrate an operation procedure of a terminal for virtual cell formation in a wireless communication system according to the present disclosure.

FIG. 10 illustrates an operation procedure of a terminal for virtual cell formation in a wireless communication system according to the present disclosure.

Referring to FIG. 10, in block 1001, the terminal transmits/receives a beam training signal with a BS, determines an uplink beam and a downlink beam, and exchanges index information about the determined beams with the BS. After that, the terminal proceeds to block 1003 and performs a network access procedure. Here, the terminal receives beam training reference signals each having different directivity through a plurality of beams that the BS supports, measures a signal quality of each reference signal, and selects the reference signal of the best signal quality. Also, the terminal can transmit beam training reference signals each having different directivity through a plurality of beams included in the terminal. In an embodiment, each beam training reference signal can include information necessary for index information cell construction for a corresponding beam.

After that, in block 1005, the terminal receives collaborative BS information and scheduling information, from the BS. That is, the terminal receives information about a collaborative BS having, as a collaborative beam, the downlink beam of the BS that the terminal has selected in block 1001, and scheduling information for beam training with the collaborative BS, from the BS.

Next, in block 1007, the terminal analyzes the collaborative BS information received from the BS and determines if the collaborative BS exists. When it is determined in block 1007 that the collaborative BS information received from the BS indicates that the collaborative BS does not exist, the terminal proceeds to block 1021 and receives allocation of resources from the BS and communicates with the BS. Next, the terminal proceeds to block 1023 and senses if the beam is changed according to beam tracking. When it is determined in block 1023 that the change of the beam is not sensed, the terminal returns to block 1021 and again performs the subsequent blocks. In contrast, when it is determined in block 1023 that the change of the beam is sensed, the terminal proceeds to block 1005 and again performs the subsequent blocks.

In contrast, when it is determined in block 1007 that the collaborative BS information received from the BS indicates that the collaborative BS exists, the terminal proceeds to block 1009 and transmits/receives a beam training signal with the cooperative BSs according to the scheduling information, and determines an uplink beam and a downlink beam. Next, the terminal proceeds to block 1011 and exchanges index information about the determined uplink beam and downlink beam with the collaborative BS and, on the basis of the exchanged information, sets up a link for communication. In an embodiment, instead of performing beam training about all beams of the cooperative BS, the terminal transmits/receives beam training signals only regarding partial beams, i.e., the beams determined as the candidates among the beams of the collaborative BS.

Next, in block 1013, the terminal determines if beam training for all collaborative BSs has been performed. When it is determined in block 1013 that the beam training for the all the collaborative BSs has not been performed, the terminal returns to block 1009 and again performs the subsequent blocks.

In contrast, when it is determined in block 1013 that the beam training for all the collaborative BSs has been performed, the terminal proceeds to block 1015 and receives scheduling information from a master or slave BS. Next, in block 1017, the terminal communicates with the master or slave BS according to the received scheduling information. After that, the terminal proceeds to block 1019 and senses if the beam is changed according to the beam tracking. When it is determined in block 1019 that the change of the beam is not sensed, the terminal returns to block 1015 and again performs the subsequent blocks. In contrast, when it is determined in block 1019 that the change of the beam is sensed, the terminal returns to block 1005 and again performs the subsequent blocks.

Figure 11:
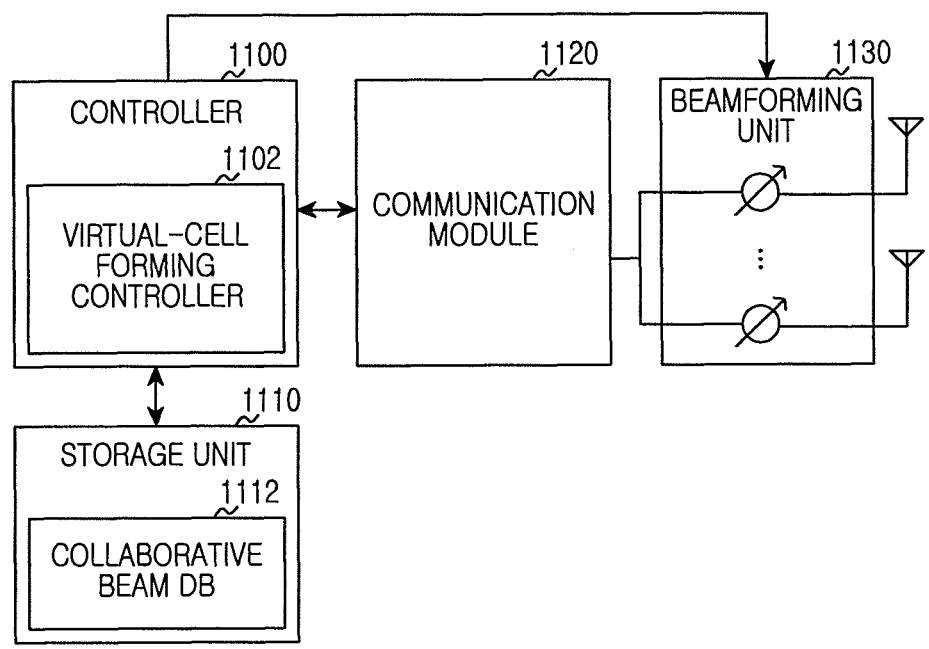
FIG. 11 illustrate a construction of a BS in a wireless communication system according to the present disclosure.

FIG. 11 is a block diagram illustrating a construction of a BS in a wireless communication system according to the present disclosure.

Referring to FIG. 11, the BS includes a controller 1100, a storage unit 1110, a communication module 1120, and a beamforming unit 1130.

The controller 1100 controls and processes a general operation of the BS, and, by including a virtual-cell forming controller 1102 according to the present disclosure, controls and processes a function for forming a virtual cell for a terminal. Particularly, the virtual-cell forming controller 1102 controls and processes a function for performing beam training through collaborative beam information stored in a collaborative beam DataBase (DB) 1112 of the storage unit 1110. In other words, after transmitting/receiving a beam training signal with the terminal and determining a downlink beam and an uplink beam for initial access of the terminal, the virtual-cell forming controller 1102 controls and processes a function for, to form the virtual cell for the terminal, searching the collaborative beam DB 1112 for collaborative beam information about the determined downlink beam and sending a request for virtual cell formation to a collaborative BS corresponding to the searched collaborative beam information. In an embodiment, the virtual-cell forming controller 1102 controls and processes a function for scheduling resources for beam training between the BS itself and a collaborative BS. Also, the virtual-cell forming controller 1102 controls and processes a function for, when receiving a request for virtual cell formation from a neighboring BS, confirming downlink beam information received from the neighboring BS having requested the virtual cell formation, searching the collaborative beam DB 1112 for beams having the confirmed downlink beam as a collaborative beam, determining the searched beams as candidate beams, and performing beam training with the terminal on the basis of beam indexes of the candidate beams. In an embodiment, the virtual-cell forming controller 1102 can transmit scheduling information, which represents resources that perform beam training with the terminal, to the neighboring BS having requested the virtual cell formation. Also, upon a failure of beam training about a specific candidate beam, the virtual-cell forming controller 1102 may be able to select a candidate beam other than the specific candidate beam and perform beam training about the selected candidate beam, or may be able to re-attempt beam training about the specific candidate beam after waiting for a predetermined time, or may be able to give up the virtual cell formation.

Also, the virtual-cell forming controller 1102 controls and processes a function for, when a channel state of a currently selected beam is less than a threshold condition according to a movement of a terminal that is communicating, executing beam tracking and changing the beam, and re-forming a virtual cell according to the beam change.

The virtual-cell forming controller 1102 controls and processes a function for, when a beam to be used for communication with the terminal is selected through beam training, controlling the beamforming unit 1130 and communicating with the terminal through the selected beam.

The storage unit 1110 stores various programs and data necessary for an operation of the BS. Particularly, the storage unit 1110 includes the collaborative beam DB 1112 having stored collaborative beam information of a neighboring BS for each of a plurality of beams that the BS supports, i.e., collaborative beam index information. The collaborative beam DB 1112 may be previously stored upon design or may be updated by feedback information of the terminal.

The communication module 1120 converts a transmission bit stream into a baseband signal or converts a baseband signal into a reception bit stream according to the physical layer standard of the system. The communication module 1120 can perform functions of channel coding and decoding, data modulation and demodulation, precoding for multiple antenna mapping, postcoding, Analog to Digital Converter (ADC), Digital to Analog Converter (DAC), Fast Fourier Transform (FFT), Inverse Fast Fourier Transform (IFFT), digital beamforming and the like. For example, according to an Orthogonal Frequency Division Multiplexing (OFDM) scheme, at data transmission, the communication module 1120 creates complex symbols by coding and modulating a transmission bit stream, maps the complex symbols to subcarriers, and constructs OFDM symbols through IFFT operation and Cyclic Prefix (CP) insertion.

The beamforming unit 1130 includes a plurality of constituent elements, and each constituent element adjusts a phase of a signal and a magnitude thereof at each antenna path. That is, the beamforming unit 1130 performs beamforming by adjusting a phase and magnitude of the signal transmitted by each antenna path according to a phase and magnitude value of the signal by antenna provided from the controller 1100. For instance, the beamforming unit 1130 can form a plurality of beams each having different directivity so as to perform beam training according to the control of the virtual-cell forming controller 1102. In FIG. 11, a path corresponding to each antenna is illustrated as one, and even a constituent element of the beamforming unit 1130 on each antenna is illustrated as one per antenna. According to another embodiment of the present disclosure, a transmission path and a reception path can be separately constructed regarding each antenna. In this situation, the constituent elements of the beamforming unit 1130 can exist two per antenna.

In FIG. 11, a block construction of the BS supporting a plurality of beams through analog beamforming is illustrated by way of example. A BS according to the present disclosure may be able to support a plurality of beams using at least one of digital beamforming, beamforming physically moving an antenna, predefined antennas corresponding to respective beam directions, antenna bundles or antenna arrays. Here, in embodiments of the digital beamforming, the beamforming unit 1130 can be omitted. The controller 1100 can support a plurality of beams by multiplying a transmit signal by a codebook and performing beamforming. That is, the beam according to the present disclosure can be a beam formed by physically distinguishing one antenna, or can be a beam formed using a plurality of antennas on the basis of various schemes such as digital beamforming, analog beamforming schemes, and the like.

Figure 12:
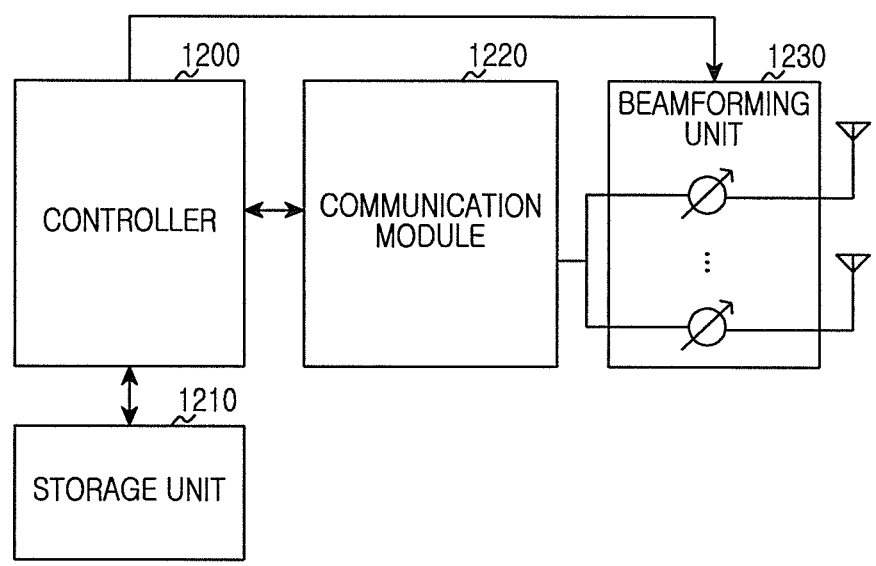
FIG. 12 illustrate a construction of a terminal in a wireless communication system according to the present disclosure.

FIG. 12 is a block diagram illustrating a construction of a terminal in a wireless communication system according to the present disclosure.

Referring to FIG. 12, the terminal includes a controller 1200, a storage unit 1210, a communication module 1220, and a beamforming unit 1230.

The controller 1200 controls and processes a general operation of the terminal, and controls and processes a function for performing beam training with the BS according to the present disclosure. Particularly, the controller 1200 controls and processes a function for performing beam training with a BS according to scheduling information of the BS, selecting a downlink beam, and transmitting index information of the selected downlink beam to the BS, and a function for receiving index information of an uplink beam from the BS. Also, the controller 1200 controls and processes a function for, when a beam to be used for communication with the BS is selected through beam training, controlling the beamforming unit 1230 and communicating with the terminal through the selected beam.

The storage unit 1210 stores various programs and data necessary for an operation of the terminal.

The communication module 1220 converts a transmission bit stream into a baseband signal or converts a baseband signal into a reception bit stream according to the physical layer standard of the system. The communication module 1220 can perform functions of channel coding and decoding, data modulation and demodulation, precoding for multiple antenna mapping, postcoding, ADC, DAC, IFFT, digital beamforming and the like. For example, according to an OFDM scheme, at data transmission, the communication module 1220 creates complex symbols by coding and modulating a transmission bit stream, maps the complex symbols to subcarriers, and constructs OFDM symbols through IFFT operation and CP insertion.

The beamforming unit 1230 includes a plurality of constituent elements, and each constituent element adjusts a phase of a signal and a magnitude thereof at each antenna path. That is, the beamforming unit 1230 performs beamforming by adjusting a phase and magnitude of the signal transmitted by each antenna path according to a phase and magnitude value of the signal by antenna provided from the controller 1200. For instance, the beamforming unit 1230 can form a plurality of beams each having different directivity so as to perform beam training according to the control of the controller 1200. In FIG. 12, a path corresponding to each antenna is illustrated as one, and even a constituent element of the beamforming unit 1230 on each antenna is illustrated as one per antenna. According to another embodiment of the present disclosure, a transmission path and a reception path can be separately constructed regarding each antenna. In this situation, the constituent elements of the beamforming unit 1230 can exist two per antenna.

In FIG. 12, a block construction of the BS supporting a plurality of beams through analog beamforming is illustrated by way of example. A BS according to the present disclosure may be able to support a plurality of beams using at least one of digital beamforming, beamforming physically moving an antenna, predefined antennas corresponding to respective beam directions, antenna bundles or antenna arrays. Here, in embodiments of the digital beamforming, the beamforming unit 1230 can be omitted. The controller 1200 can support a plurality of beams by multiplying a transmit signal by a codebook and performing beamforming. That is, a beam according to the present disclosure may include not only a beam formed by physically distinguishing one antenna but also a beam formed using a plurality of antennas on the basis of various schemes such as digital beamforming, analog beamforming schemes, and the like.

As described above, embodiments of the present disclosure, by forming a virtual cell on the basis of collaborative beam index information between BSs, are capable of forming the virtual cell within a short time and reducing energy consumption and delay dependent on beam training in a wireless communication system.

While the disclosure has been shown and described with reference to certain preferred embodiments thereof, it will be understood by those skilled in the art that various changes in form and details may be made therein without departing from the spirit and scope of the disclosure as defined by the appended claims.

What is claimed is:

1. For use at a Base Station (BS), a method for forming a virtual cell in a wireless communication system, the method comprising:

determining at least one beam among a plurality of beams of the BS through beam training with a terminal;

determining a collaborative beam of a neighboring BS for the determined beam;

transmitting, to the neighboring BS having the collaborative beam, information on the at least one beam and information on the terminal to form a virtual cell; and transmitting, to the terminal, information on the neighboring BS having the collaborative beam to form the virtual cell.

2. The method of claim 1, wherein the BS previously stores, as collaborative beam information, beam information of a neighboring BS having the overlapped coverage area regarding each of the beams that the BS supports, and wherein the collaborative beam information is changeable by feedback information of the terminal.

3. The method of claim 1, further comprising:

receiving collaborative beam information about a link with the terminal from the neighboring BS, wherein the at least one beam and the collaborative beam are used for communicating with the terminal by forming a virtual cell for the terminal.

4. The method of claim 1, further comprising:

when there are a plurality of neighboring BSs having collaborative beams for the determined beam, receiving scheduling information, which represents resources for beam training with the terminal, from the plurality of neighboring BSs;

scheduling resources for beam training of the plurality of neighboring BSs considering at least one of the scheduling information, the number of collaborative beams of each of the plurality of neighboring BSs, a beam intensity of each of the plurality of neighboring BSs, and load information of each of the plurality of neighboring BSs; and transmitting information representing scheduling of the BS, to the terminal and the plurality of neighboring BSs.

5. For use in a neighboring Base Station (BS), a method for forming a virtual cell in a wireless communication system, the method comprising:

receiving information on at least one beam of a first BS and information on a terminal, from the first BS;

determining at least one candidate collaborative beam for the at least one beam of the first BS; and selecting a collaborative beam for virtual cell formation by performing beam training with the terminal using the determined at least one candidate collaborative beam.

6. The method of claim 5, wherein the neighboring BS previously stores, as collaborative beam information, beam information of the first BS having the overlapped coverage area regarding each of beams that the neighboring BS supports, and wherein the collaborative beam information is changeable by feedback information of the terminal.

7. The method of claim 5, further comprising:

transmitting information of the collaborative beam selected for the virtual cell formation, to the first BS, wherein the at least one beam of the first BS and the collaborative beam are used for communicating with the terminal by forming a virtual cell for the terminal.

8. The method of claim 5, further comprising:

transmitting scheduling information, which represents resources for beam training with the terminal, to the first BS; and receiving a response to scheduling from the first BS.

9. For use in a terminal, a method for forming a virtual cell in a wireless communication system, the method comprising:

performing first beam training with a first Base Station (BS);

receiving information about a neighboring BS that will form a virtual cell, from the first BS; and determining at least one collaborative beam for the neighboring BS through second beam training with the neighboring BS, wherein the second beam training is performed for at least one candidate collaborative beam for a beam of the first BS determined through the first beam training, among a plurality of beams of the neighboring BS.

10. The method of claim 9, further comprising:

receiving scheduling information, which represents resources for the second beam training with the neighboring BS, from the first BS, wherein the second beam training is performed based on the scheduling information.

11. A Base Station (BS) apparatus for forming a virtual cell in a wireless communication system, the apparatus comprising:

a beamforming unit configured to form a plurality of beams each having different directivity; and a controller configured to determine at least one beam among the plurality of beams of the BS through beam training with a terminal, determine a collaborative beam of a neighboring BS for the determined beam, and transmit, to the neighboring BS having the collaborative beam, information on the at least one beam and information on the terminal to form a virtual cell, and transmit, to the terminal, information on the neighboring BS having the collaborative beam to form the virtual cell.

12. The apparatus of claim 11, further comprising a storage unit configured to previously store, as collaborative beam information, beam information of a neighboring BS having the overlapped coverage area regarding each of beam indexes that the BS supports, and wherein the collaborative beam information is changeable by feedback information of the terminal.

13. The apparatus of claim 11, wherein the controller is configured to control a function for receiving collaborative beam information about a link with the terminal from the neighboring BS, wherein the at least one beam and the collaborative beam are used for communicating with the terminal by forming a virtual cell for the terminal.

14. The apparatus of claim 11, wherein the controller is configured to control a function for:

when there are a plurality of neighboring BSs having collaborative beams for the determined beam, receiving scheduling information, which represents resources for beam training with the terminal, from the plurality of neighboring BSs;

scheduling resources for beam training of the plurality of neighboring BSs considering at least one of the scheduling information, the number of collaborative beams of each of the plurality of neighboring BSs, a beam intensity of each of the plurality of neighboring BSs, and load information of each of the plurality of neighboring BSs; and transmitting information representing scheduling of the BS, to the terminal and the plurality of neighboring BSs.

15. A neighboring Base Station (BS) apparatus for forming a virtual cell in a wireless communication system, the apparatus comprising:

a beamforming unit configured to form a plurality of beams each having different directivity; and a controller configured to receive information on at least one beam of a first BS and information on a terminal, from the first BS, determine at least one candidate collaborative beam for at least one beam of the first BS, and select a collaborative beam for virtual cell formation by performing beam training with the terminal using the determined at least one candidate collaborative beam.

16. The apparatus of claim 15, further comprising a storage unit configured to previously store, as collaborative beam information, beam information of the first BS having the overlapped coverage area regarding each of beam indexes that the neighboring BS supports, wherein the collaborative beam information is changeable by feedback information of the terminal.

17. The apparatus of claim 15, wherein the controller is configured to control a function for transmitting information of the collaborative beam selected for the virtual cell formation, to the first BS, wherein the at least one beam of the first BS and the collaborative beam are used for communicating with the terminal by forming a virtual cell for the terminal.

18. The apparatus of claim 15, wherein the controller is configured to control a function for transmitting scheduling information, which represents resources for beam training with the terminal, to the first BS, and receiving a response to scheduling from the first BS.

19. An apparatus of a terminal for forming a virtual cell in a wireless communication system, the apparatus comprising:
    a beamforming unit configured to form a plurality of beams each having different directivity; and
    a controller configured to control a function for performing first beam training with a first Base Station (BS), receiving information about a neighboring BS that will form a virtual cell, from the first BS, and determining at least one collaborative beam for the neighboring BS through second beam training with the neighboring BS,
    wherein the second beam training is performed for at least one candidate collaborative beam for a beam of the first BS determined through the first beam training, among a plurality of beams of the neighboring BS.

20. The apparatus of claim 19, wherein the controller is configured to receive scheduling information, which represents resources for the second beam training with the neighboring BS, from the first BS,
    wherein the second beam training is based on the scheduling information.

* * * * *